(12) United States Patent
Kawamoto et al.

(10) Patent No.: US 7,125,063 B2
(45) Date of Patent: Oct. 24, 2006

(54) LID MECHANISM AND CENTER CONSOLE BOX

(75) Inventors: Masanobu Kawamoto, Yokohama (JP); Ryuhei Nishida, Yokohama (JP)

(73) Assignee: Nifco Inc., Yokohama (JP)

( * ) Notice: Subject to any disclaimer, the term of this patent is extended or adjusted under 35 U.S.C. 154(b) by 61 days.

(21) Appl. No.: 11/117,472

(22) Filed: Apr. 29, 2005

(65) Prior Publication Data

US 2005/0248170 A1    Nov. 10, 2005

(30) Foreign Application Priority Data

May 10, 2004    (JP)    .............................. 2004-140019

(51) Int. Cl.
    *B60N 3/12*    (2006.01)
(52) U.S. Cl. .................... 296/37.8; 296/24.34
(58) Field of Classification Search ............. 296/37.8, 296/24.34; 224/924; 220/326, 263, 524, 220/908
See application file for complete search history.

(56) References Cited

U.S. PATENT DOCUMENTS

| 3,490,642 | A | * | 1/1970 | Friedlander | ................. 220/817 |
| 5,092,484 | A | * | 3/1992 | Daugherty et al. | ......... 220/812 |
| 5,248,057 | A | * | 9/1993 | Taylor | ........................ 220/263 |
| 5,622,404 | A | * | 4/1997 | Menne | .................... 297/188.1 |
| 5,634,218 | A | * | 6/1997 | Ouelette | ........................ 4/498 |
| 5,644,803 | A | * | 7/1997 | Wilson | .......................... 4/500 |
| 5,678,693 | A | * | 10/1997 | Tapp et al. | ................. 220/819 |
| 5,724,837 | A | * | 3/1998 | Shin | ........................... 220/263 |
| 5,819,332 | A | * | 10/1998 | Perry | ............................. 4/498 |
| 5,860,281 | A | * | 1/1999 | Coffee et al. | ................ 62/3.62 |
| 6,045,173 | A | * | 4/2000 | Tiesler et al. | .............. 296/37.8 |
| 6,419,314 | B1 | * | 7/2002 | Scheerhorn | ................ 296/37.8 |
| 6,497,443 | B1 | * | 12/2002 | Worrell et al. | ............. 296/37.8 |
| 6,634,036 | B1 | * | 10/2003 | Tudor | ............................. 4/498 |
| 6,665,890 | B1 | * | 12/2003 | Tedrick | ......................... 4/498 |
| 6,719,343 | B1 | * | 4/2004 | Emerling et al. | ........ 296/24.34 |
| 2002/0089203 | A1 | * | 7/2002 | Flowerday et al. | ........ 296/37.8 |
| 2003/0127877 | A1 | * | 7/2003 | Luginbill et al. | .......... 296/37.8 |

FOREIGN PATENT DOCUMENTS

JP    5-20605    5/1993

* cited by examiner

*Primary Examiner*—Kiran B. Patel
(74) *Attorney, Agent, or Firm*—Manabu Kanesaka

(57) ABSTRACT

A lid mechanism includes a divided lid for closing an opening extending in a longitudinal direction in a closed position, and a lid operating mechanism disposed below the opening closed by the divided lid. The divided lid has at least a front lid for closing a front part of the opening in the closed position and a rear lid for closing a rear part of the opening in the closed position. With the lid operating mechanism, the front lid in the closed position slides from a front part side to a rear part side and enters below the rear lid in the closed position in an overlapped state. Then, the front lid moves downwardly together with the rear lid in the overlapped state while a front end of the front lid faces upwardly.

12 Claims, 18 Drawing Sheets

LID MECHANISM AND CENTER CONSOLE BOX

BACKGROUND OF THE INVENTION AND RELATED ART STATEMENT

The present invention relates to a lid mechanism having two or more lids for opening and closing an opening of various types of storage bodies, and relates to a center console box with an upper opening extending in a longitudinal direction of a vehicle to be closed with the lid mechanism.

When a storage body has an opening extending in a longitudinal direction and the opening is closed with a lid body, the lid body becomes an obstacle for inserting a hand into the storage body through the opening in an open state. Patent Document 1 has disclosed a console box in which a lid body rotates upwardly around a rotating shaft and slides downwardly, thereby making an upward projection small by a limited amount. When the lid body rotates upwardly and a large portion of the lid body enters below the opening in the upright position, it is possible to improve convenience. In this case, it is necessary to provide a large storage space for the lid body, in the upright position, thereby increasing a size of the storage body.

Patent Document 1: Japanese Utility Model Publication (Kokoku) No. 05-20605

In view of the problems described above, an object of the present invention is to provide a lid mechanism for opening and closing an opening extending in a longitudinal direction without being an obstacle in an open state and increasing a size of a storage body.

Another object of the present invention is to provide a center console box having the lid mechanism.

Further objects and advantages of the invention will be apparent from the following description of the invention.

SUMMARY OF THE INVENTION

In order to attain the objects described above, according to the present invention, a lid mechanism includes: a divided lid for closing an opening extending in a longitudinal direction in a closed position, and a lid operating mechanism disposed below the opening closed by the divided lid. The divided lid has at least a front lid for closing a front part of the opening in the closed position and a rear lid for closing a rear part of the opening in the closed position. With the lid operating mechanism, the front lid in the closed position slides from a front part side of the opening to a rear part side of the opening and enters below the rear lid in the closed position in an overlapped state. Then, the front lid moves downwardly together with the rear lid in the overlapped state while a front end of the front lid faces upwardly.

In the lid mechanism of the present invention, the front lid and the rear lid moves downwardly to open the opening while the front lid and the rear lid rotate upwardly together so that the front ends of the lids are oriented upwardly in the overlapped state. Accordingly, it is possible to store the lids below the opening in a storage space with a depth corresponding to a longitudinal dimension of the lids without projecting above the opening. The lids move downwardly while rotating upwardly together. Accordingly, it is possible to reduce a size of the storage space in the longitudinal direction. When only the front lid slides and is held, it is possible to open only the front part of the opening. The lid operating mechanism operates the front lid and the rear lid regularly, and an operation thereof is performed manually or with a motor or the like.

According to the present invention, the front lid may be provided with a moving device (for example, a release cavity relative to a link pin) for moving the rear lid downwardly together with the front lid while releasing the rear lid from the closed position when the front lid slides to the rear part side of the opening. The front lid may be provided with a returning device (for example, a hook cavity relative to a return operation pin) for moving the rear lid upwardly to return the rear lid to the closed state when the front lid moves to the closed position from a position that the front lid moves completely downwardly. Accordingly, it is possible to move the rear lid forward to open the opening when the front lid moves in an opening direction. It is possible to move the rear lid backward to close the opening when the front lid moves in a closing direction.

According to the present invention, the operating mechanism may comprise: a front lid supporting device; a formation of a first cam groove; a formation of a second cam groove and a catch cavity having a cavity entrance facing downwardly at a side of the formation of the first cam groove, and a formation of a support cam wall having a wall surface facing a front, side and disposed behind the second cam groove. The front lid has a bracket part, and a front trace pin and a rear trace pin disposed at front and rear sides of the bracket part with a space in between. The first cam groove is provided for guiding the front trace pin and rear trace pin. The front lid slides from the front part side of the opening to the rear part side of the opening, so that the front lid enters below the rear lid in the closed position in the overlapped state. Then, the front lid moves downwardly while rotating upright, so that the front end of the lid is oriented upwardly with the rear trace pin as center of rotation.

The rear lid has a bracket part and a trace pin on the bracket part. The second cam groove is provided for guiding the trace pin of the rear lid. The rear lid moves downwardly while rotating upright, so that the front end of the lid is oriented upwardly with the trace pin as center of rotation.

The rear lid further comprises: a rotating body assembled to be rotatable with the trace pin of the rear lid as center of rotation, and having a posture control pin on a free end facing a rear side in a state that the rear lid is in the closed position; a link pin provided at a place further back from the trace pin on the bracket part in the state that the rear lid is in the closed position; and a forcing device disposed between the bracket part and the rotating body for normally urging in a direction of separating a space apart between the posture control pin and the link pin. With the forcing of the forcing device, in the state that the rear lid is in the closed position, the link pin enters the catch cavity from beneath, and the posture control pin is pushed against the support cam wall. A release cavity is formed in the bracket part of the front lid for allowing the link pin to enter from behind at a position where the front lid enters beneath the rear lid in the closed position in the overlapped state, and allowing the link pin to escape from the catch cavity accompanying with the downwardly movement of the front lid.

The closed lid state of the front lid in the closed position is maintained by the supporting device. In addition, the front lid in the closed position is capable of moving downwardly by the guiding of the first cam groove. The front trace pin and the rear trace pin enter the first cam groove, so that the front lid moves regularly and stably.

When the rear lid is in the closed position, the link pin enters the catch cavity and the posture control pin is pushed against the support cam wall by the forcing of the forcing device in the state in which the trace pin enters the first cam groove. Accordingly, the closed lid state of the rear lid is maintained stably.

With the first cam groove, the front lid first moves slightly downwardly while moving backward and entering beneath the rear lid in the closed lid state as previously noted. As a result, there is no obstacle to make the upper surface of the front lid and the upper surface of the rear lid in the closed position to become the same level. When the front lid enters beneath the rear lid in the overlapped state, the link pin enters the release cavity, so that the rear lid moves accompanying with the movement of the front lid while maintaining the overlapped state. (Hereunder, the state is called a linked state, and a position of the linked state is called a linked position.)

When the first lid moves downwardly along the first cam groove from the linked state, the link pin escapes downwardly from the catch cavity, and the rear lid moves downwardly together while rotating upright, so that the front end of the lid is oriented upward. The rear lid is supported without rattling by the posture control pin continuously pushed against the support cam wall by the forcing of the forcing device throughout the entire process of the movement.

When the front lid moves completely downwardly along the first cam groove, the opening is completely opened. (Hereunder, this state is called a completely stored state.) The front lid and the rear lid are entirely or largely positioned beneath the opening in the overlapped state with the front ends of the lids oriented upwardly.

The first cam groove may have a longitudinal groove part extending in the longitudinal direction and a vertical groove part extending downwardly from the rear end of the longitudinal groove part. The second cam groove extends downwardly along the vertical groove part of the first cam groove with an upper groove end thereof positioned at a same level as a rear end of the longitudinal groove part of the first cam groove. The trace pin of the rear lid in the closed position is positioned at the upper groove end of the second cam groove. When the link pin enters the release cavity of the front lid, the rear trace pin of the front lid is positioned at the rear end of the longitudinal groove part of the first cam groove.

In the linked state, the rear trace pin as the center of rotation of the front lid and the trace pin as the center of rotation of the rear lid are positioned at the same position. After the linkage, the front lid and the rear lid linked together and overlapped rotate upright smoothly.

According to the present invention, a hook cavity opened downwardly may be formed further back from the formation of the rear trace pin in the bracket part of the front lid in the closed position. A return operation pin may be formed beneath the rotating shaft of the rotating body of the rear lid in the closed position. The return operation pin enters the hook cavity from the front accompanying the front lid and the rear lid-moving downwardly while rotating upright.

When the front lid receives a force in a direction that the front lid moves upwardly, that is, moves backward, from the completely stored state, the rear lid with the return operation pin hooked in the hook cavity moves toward the linked position while maintaining the linked state with the front lid.

The supporting device may include a drive force transmission arm with a follower end connected to the bracket part of the front lid, so that the space between the follower end and a driving end is changed accompanying the movement of the front lid. The front lid is moved by the drive force transmission arm moved by a motor. Accordingly, the forward movement and return movement of the front lid, that is, the lid opening operation and lid closing operation of the divided lid, is performed smoothly by driving the motor.

According to the present invention, the divided lid may have one or more intermediate lids disposed between the front lid and the rear lid for closing the opening in the closed position together with these. On the front end side of the intermediate lid, there is formed a front coupled part hooked from behind by a coupling part of a lid positioned in front by the forward sliding movement of the lid positioned in front. On the rear end side of the intermediate lid, there is formed a rear coupled part hooked from front by a coupling part of a lid positioned in front by the forward sliding movement of the lid positioned in front.

From the state in which each lid is in the closed position, first, the coupling part of the lid positioned in front of the intermediate lid hooks onto the rear coupled part of the intermediate lid by the backward movement of the lid positioned in front. Both lids slide and move together backward in a state in which the lid positioned in front enters beneath the intermediate lid in an overlapped state. When returning from the state in which each lid is in the completely stored state, the coupling part of the lid positioned in front of the intermediate lid hooks onto the front coupled part of the intermediate lid by the forward movement of the lid positioned in front. The intermediate lid slides and moves together up to the closed position accompanying the movement of the lid positioned in front toward the closed position.

According to the present invention, a center console box is constituted such that an opening is closed by the divided lid constituting the lid mechanism explained above.

The console box can be constituted such that, while having the opening, it is easy to insert the hand or the like into the box in the open state from any position inside the vehicle compartment. A dimension of the box in the vertical and longitudinal directions can be made as small as possible.

In the lid mechanism of the invention, the hole longitudinally long can be closed appropriately, and the divided lid does not become an obstacle in the open state. Furthermore, the storage space for the divided lid can be limited to a minimum without increasing a size of a storage body, or the like, having such opening. The center console box using the divided lid is easy to insert a hand into the box through the opening in the open state from any position in a vehicle, and it can be constituted having a minimum necessary size.

DETAILED DESCRIPTION OF PREFERRED EMBODIMENTS

Figure 1:
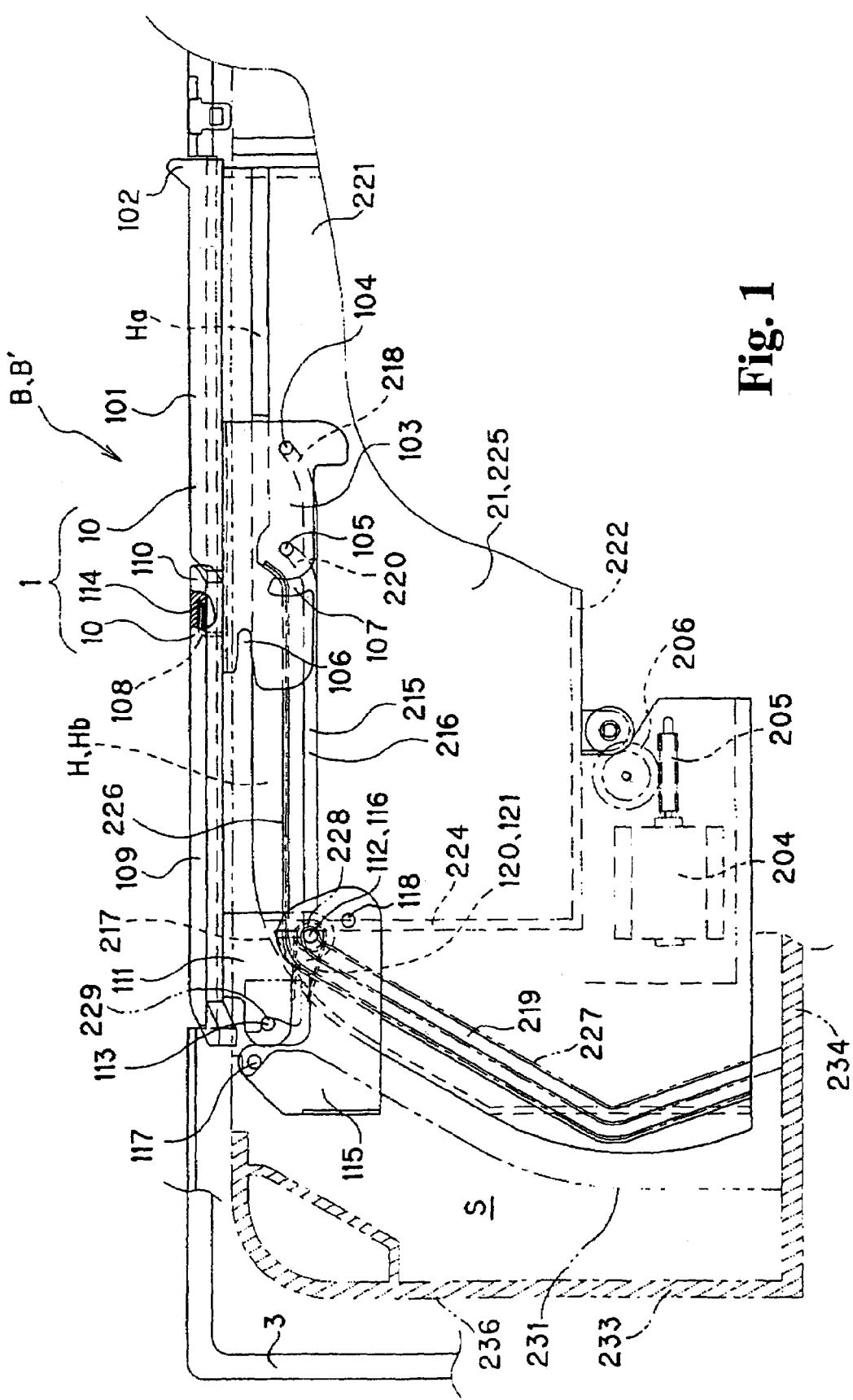
FIG. 1 is a side view showing essential components of a storage body.

Hereunder, embodiments of the present invention will be explained with reference to FIG. 1 through FIG. 18. FIG. 1, FIG. 2, and FIG. 5 to FIG. 11 show a side view of essential components of a storage body B constituted by applying a lid mechanism pertaining to the embodiment. Each lid 10 constituting a divided lid 1 in the closed position is moved forward and an opening H is opened in the order of FIG. 1, FIG. 2, FIG. 5, FIG. 6, FIG. 7, FIG. 8, FIG. 9, FIG. 10, and FIG. 11. Each lid 10 constituting the divided lid 1 in the completely stored state is moved back and the opening H is closed again in the reverse order. (In each of the drawings, a side plate 237 of an outer box 233 is omitted. In FIG. 1, a supporting device 20 is omitted. In FIG. 5 to FIG. 8 as well as FIG. 10 and FIG. 11, a forcing device 120 is omitted.)

Figure 2:
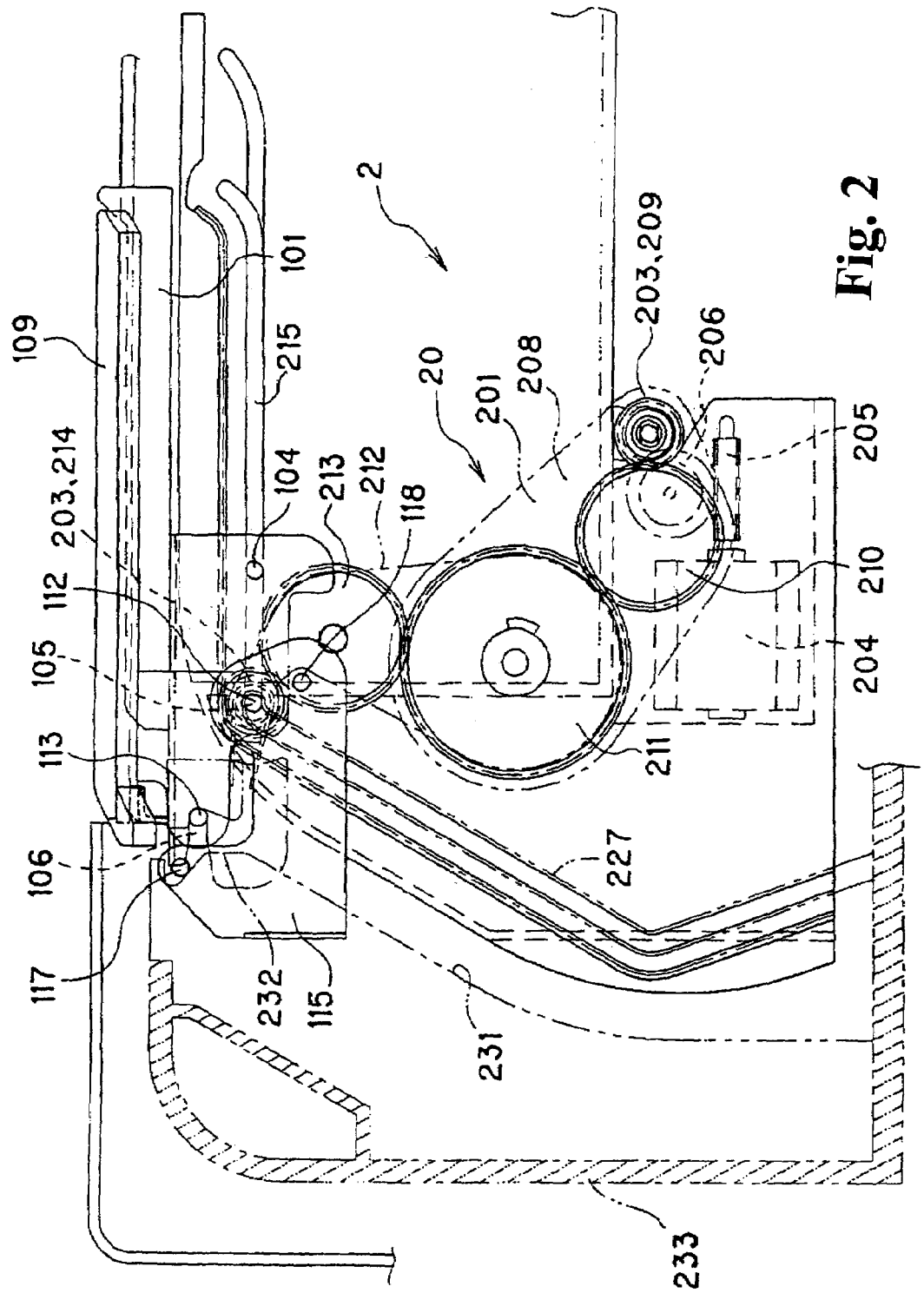
FIG. 2 is a side view showing the essential components of the storage body.
Figure 3:
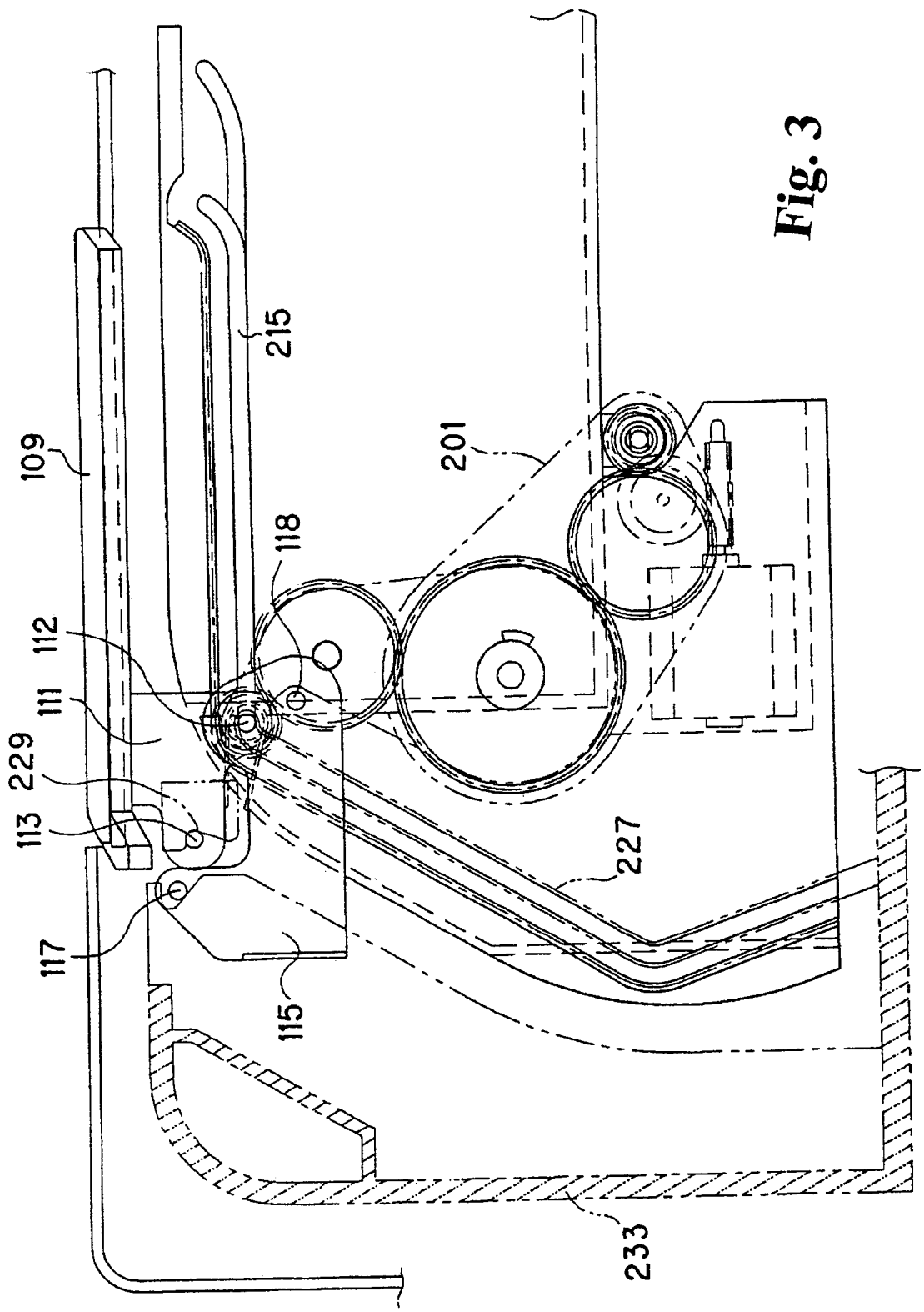
FIG. 3 is a side view showing the essential components of the storage body.
Figure 4:
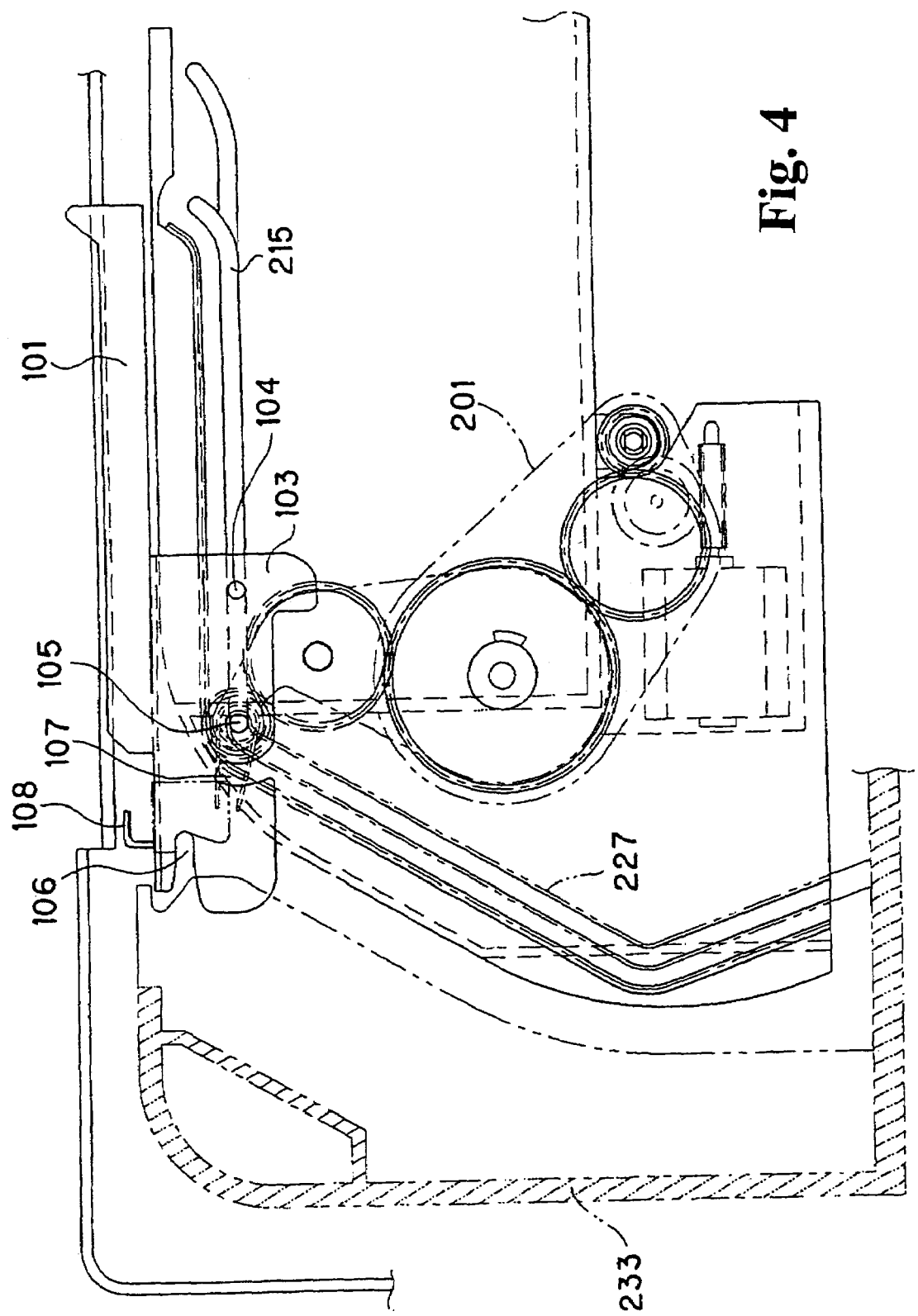
FIG. 4 is a side view showing the essential components of the storage body.
Figure 12:
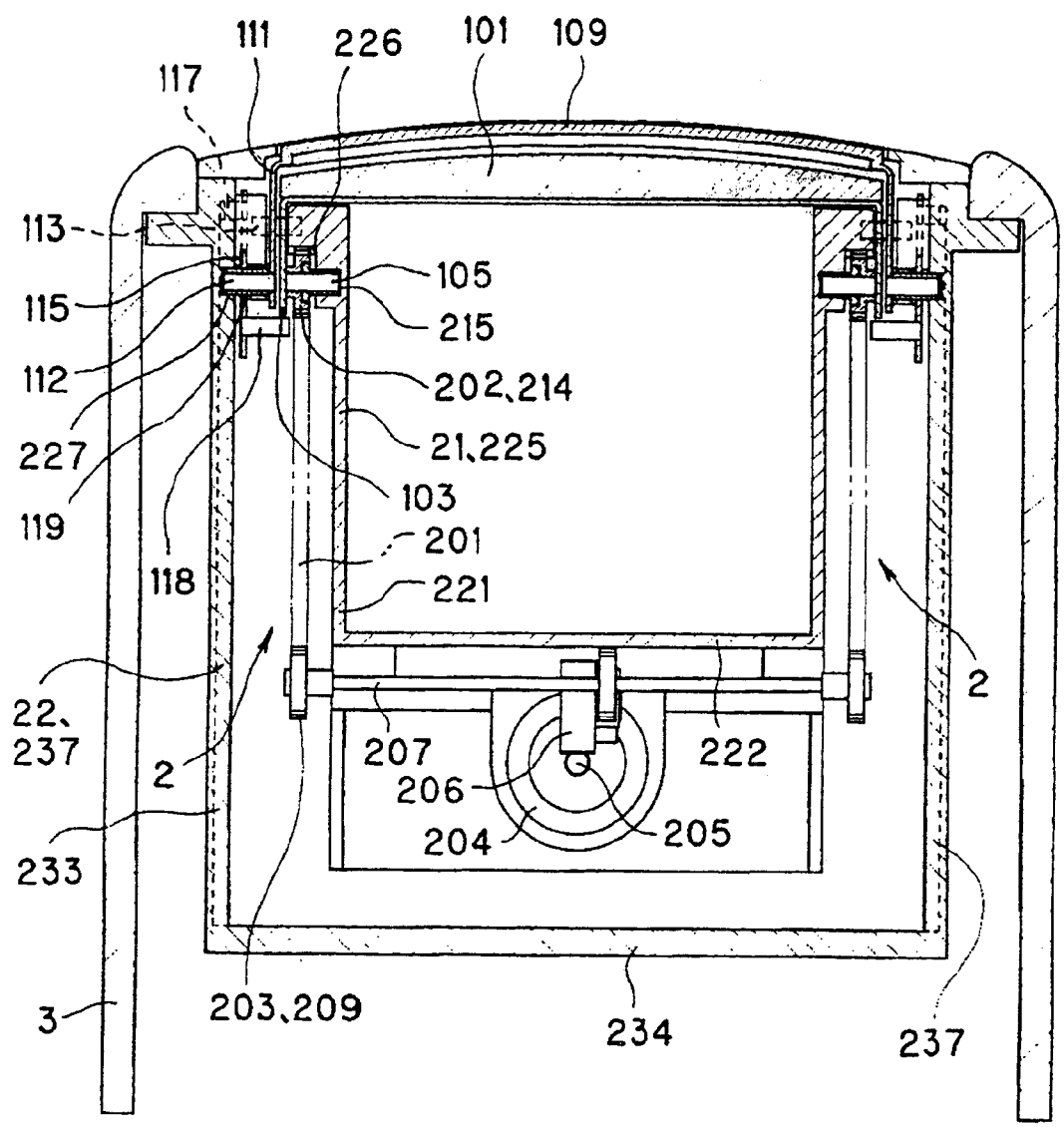
FIG. 12 is a vertical cross-sectional view of the essential components of the storage body (taken in a left-to-right direction)
Figure 13:
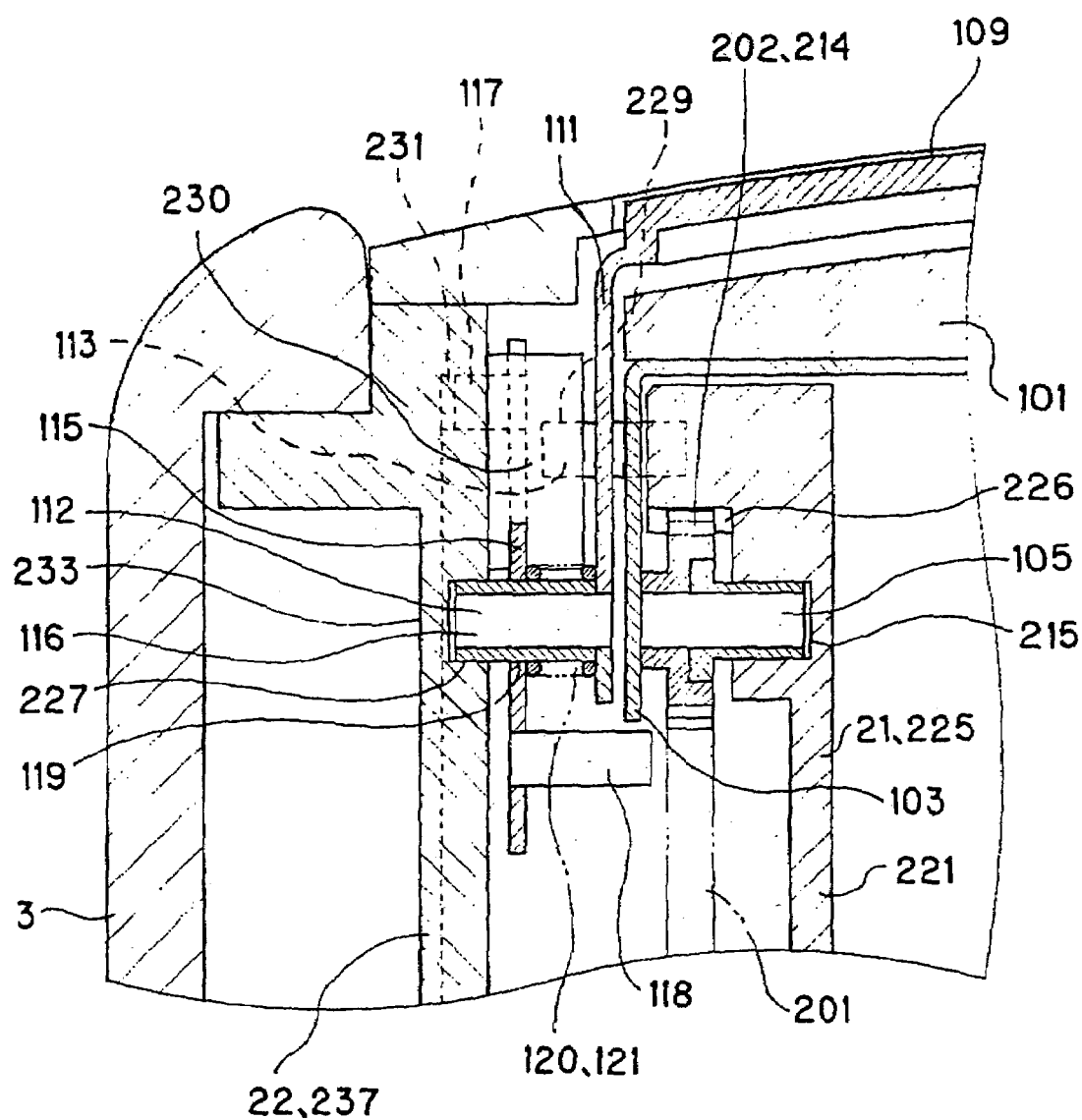
FIG. 13 is an enlarged view of the essential components shown in FIG. 12.
Figure 14:
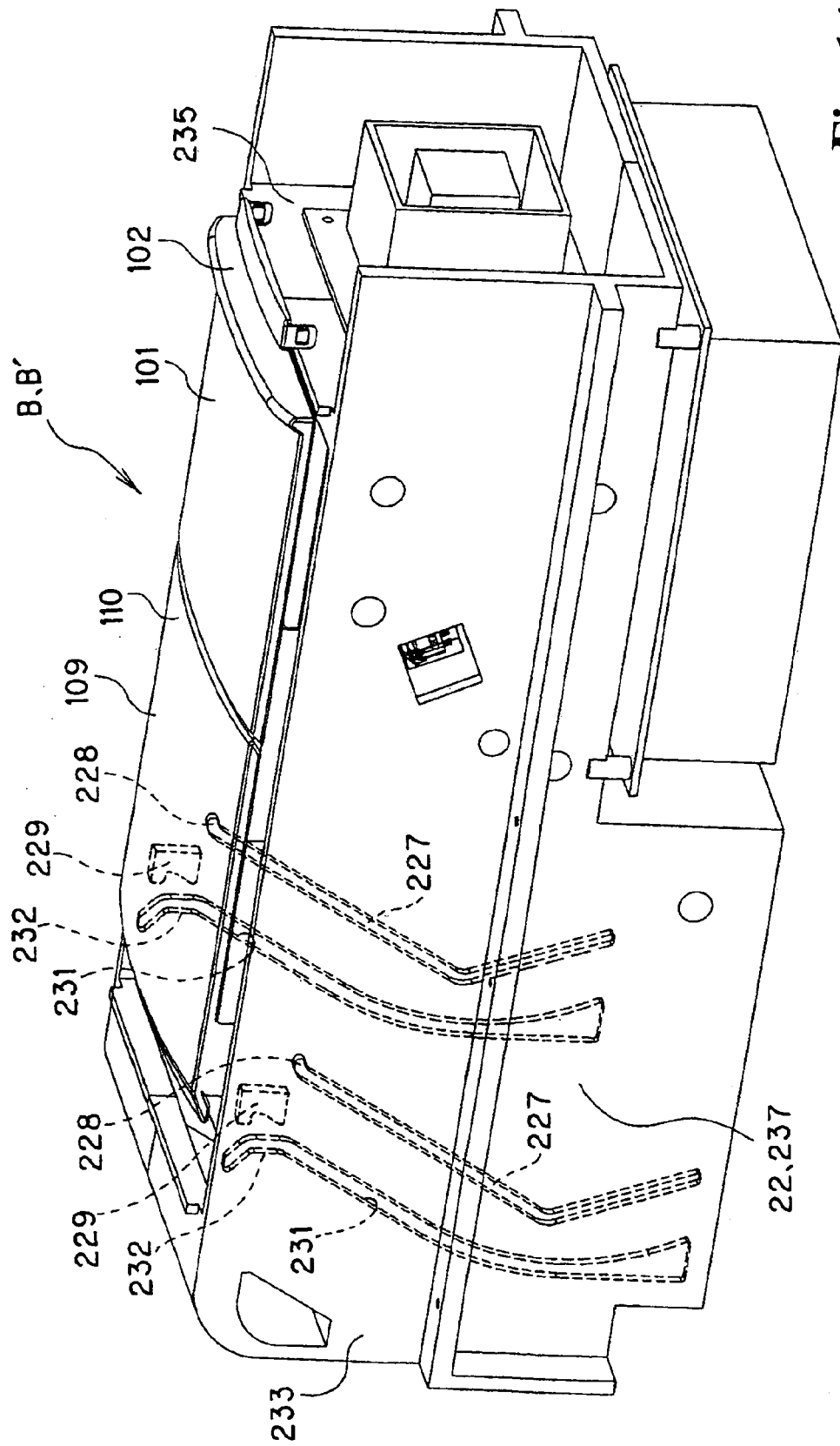
FIG. 14 is a perspective view of the storage body.
Figure 15:
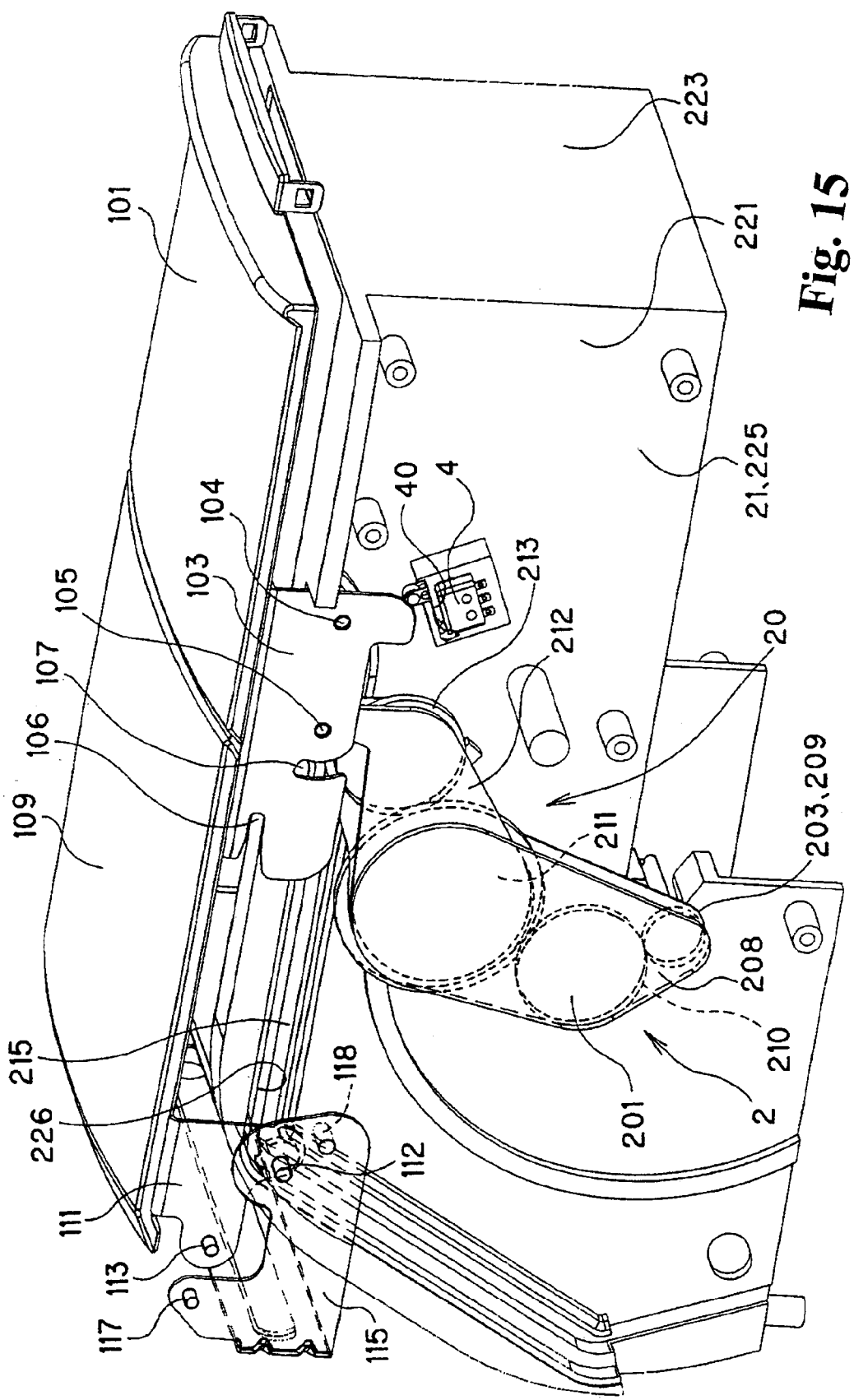
FIG. 15 is a perspective view of the storage body.
Figure 16:
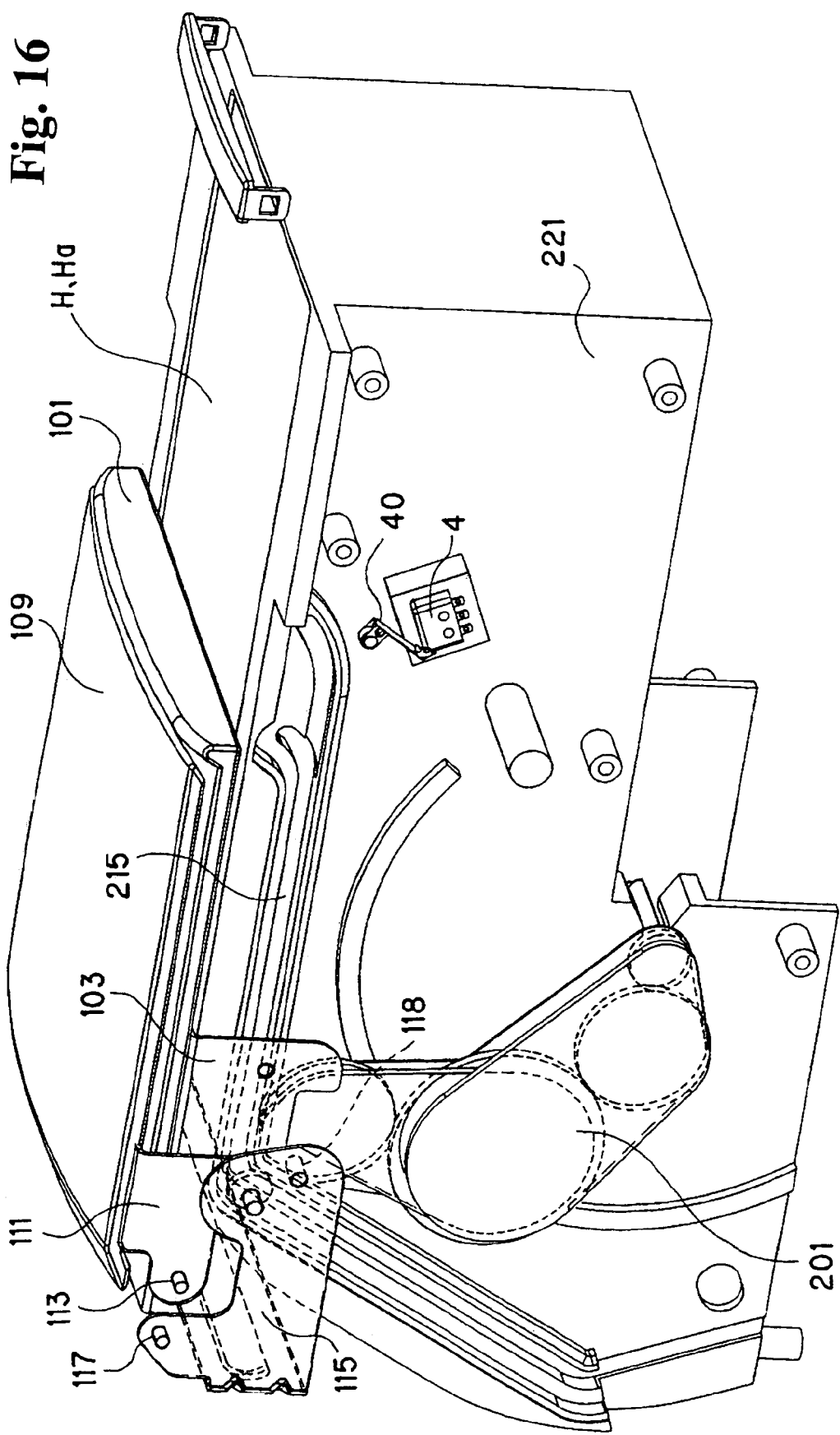
FIG. 16 is a perspective view of the storage body.
Figure 17:
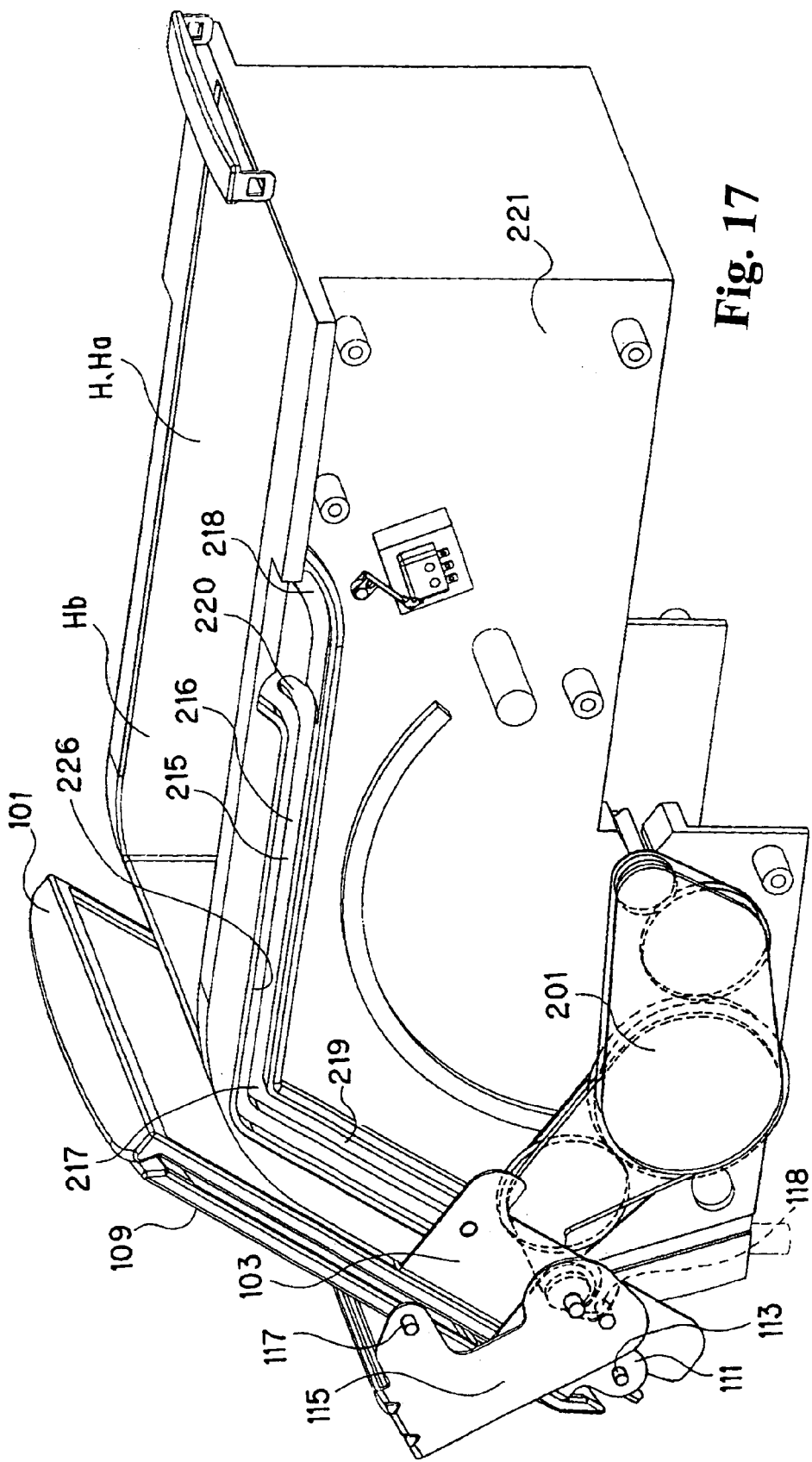
FIG. 17 is a perspective view of the storage body.
Figure 18:
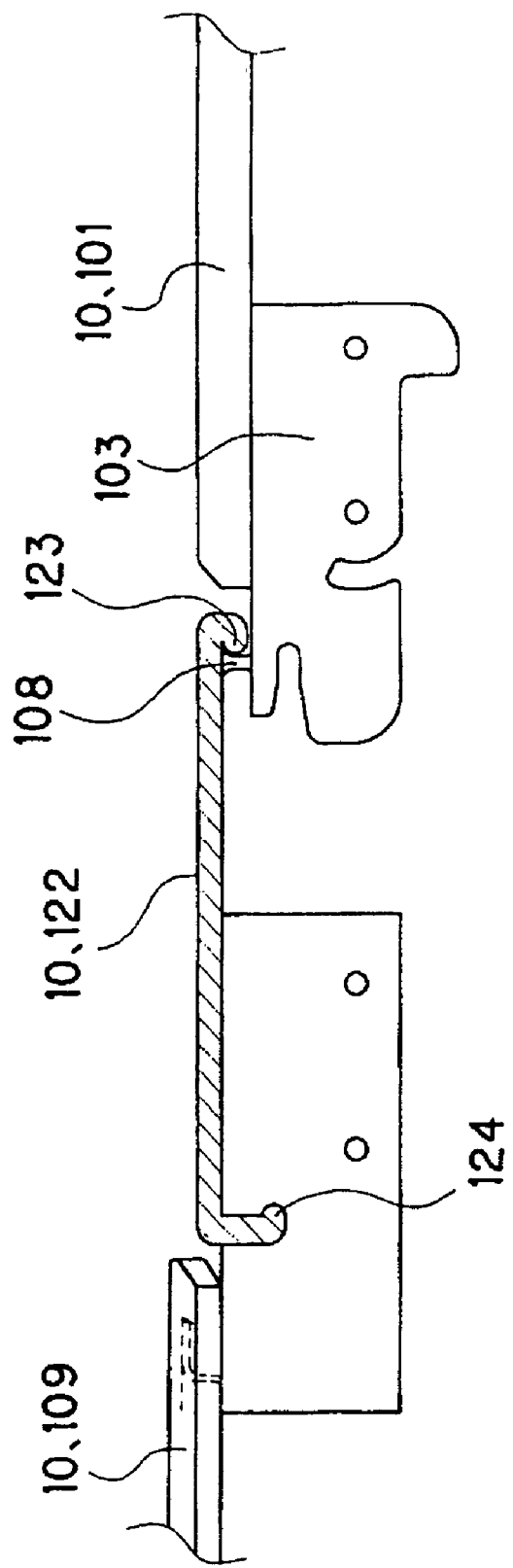
FIG. 18 is a side view showing essential components of a modified example of a divided lid shown in FIG. 1 through FIG. 17.

In FIG. 3, a front lid 101 in the state in FIG. 2 is omitted, and in FIG. 4, a rear lid 109 in FIG. 2 is omitted. FIG. 12 is a vertical sectional view of the essential components of the storage body B, and FIG. 13 is an enlarged view of a part in FIG. 12. FIG. 14 shows the storage body B when each lid 10 is in the closed position. FIG. 15 shows only an inner box 221 without the outer box 233 in the state in FIG. 14. FIG. 16 shows a state in which only the front lid 101 slides and moves backward and only the front part. Ha of the opening is opened from the state in FIG. 15. FIG. 17 shows a state in which the front lid 101 moves downwardly together with the rear lid 109 and the opening H is completely opened from the state in FIG. 16. FIG. 18 shows another example of the divided lid 1 viewing only each lid 10 constituting the divided lid 1 from the side.

In the embodiment, the lid mechanism is provided for closing the openings H of various kinds of storage bodies B to be capable of opening. Concretely, such lid mechanism has a divided lid 1 which is divided into two or more lids 10, and functions so as to expand such divided lid 1, that is, to close the opening H in a state in which the two or more lids 10 are not mutually overlapped, and to completely open the opening H in a state in which these are mutually overlapped and moved beneath this opening H.

A center console box B' pertaining to this embodiment is constituted such that an upper opening H that is long in the longitudinal direction of a vehicle is closed to be capable of opening by the lid mechanism.

Such lid mechanism comprises: a divided lid 1 which closes a longitudinally long opening H in a closed position, and a divided lid operating mechanism 2 which is positioned beneath the opening H which is closed by the divided lid 1.

Such a divided lid 1 has at least: a front lid 101 which closes a front part Ha of the opening in the closed position (position in FIG. 1), and a rear lid 109 which closes a rear part Hb of the opening in the closed position (position in FIG. 1)

With the operating mechanism 2, the front lid 101 in the closed position is slid and moved from the front part Ha side of the opening to the rear part Hb side of the opening so as to enter into an overlapped state beneath the rear lid 109 in the closed position. Then, the front lid 101 is moved downwardly together with the rear lid 109 in the state overlapped with the rear lid 109 while being rotated upright so that the front ends 102 and 110 of the lids are oriented upwardly.

With the lid mechanism, the opening H is opened by moving the front lid 101 and the rear lid 109 downwardly while rotating them upright together so that the front ends 102 and 110 of both lids 101, 109 are oriented upward in a state in which they are overlapped. Accordingly, if there is a storage space S beneath the opening H at most having a depth in the amount of the longitudinal dimension of the lid 10, the divided lid 1 can be held beneath the opening H in a manner such that the lid 10 does not project above the opening H. Both lids 101 and 109 are moved downwardly while being rotated upright together, so that the size of the storage space S in the longitudinal direction can be made as small as possible. If it is stopped in a state in which only the front lid 101 is slid and moved, it is possible to open just the front part Ha of the opening H.

Accordingly, a console box B' constituted such that an upper opening H that is long in the longitudinal direction of a vehicle is closed to be capable of opening by such lid mechanism can be constituted such that, while having such opening H, it is made easier such as to insert the hand, or the like, into the box in the open lid state even from a back seat, and also the dimensions in the vertical and longitudinal directions of the box can be made as small as possible.

Concretely, in this embodiment, the operating mechanism 2 comprises:

(1) a front lid 101 supporting device 20, (2) a formation 21 of a first cam groove 215, (3) a formation 22 of a second cam groove 227, and of a catch cavity 229 having a cavity entrance oriented downwardly, on the side of the formation 21 of a first cam groove 215, and (4) a formation 22 of a support cam wall 231 having a wall surface oriented forward behind the second cam groove 227.

The front lid 101 has a bracket part 103, and has a front trace pin 104 and a rear trace pin 105 with a space between on the bracket part 103. Such a bracket part 103 is provided on the underside on the rear end side of the front lid 101.

The first cam groove 215 is formed so as to guide the front trace pin 104 and rear trace pin 105, so that the front lid 101 is slid and moved from the front part Ha side of the opening to the rear part Hb side of the opening. Accordingly, the front lid 101 enters into an overlapped state beneath the rear lid 109 in the closed position, and then the front lid 101 is moved downwardly while being rotated upright, so that the front end 102 of the lid is oriented upward with the rear trace pin 105 as center of rotation.

The rear lid 109 has a bracket part 111, and a trace pin 112 on the bracket part 111. Such a bracket part 111 also is provided on the underside on the rear end side of the rear lid 109. The second cam groove 227 is formed so as to guide the trace pin 112 of the rear lid 109, so that the rear lid 109 is moved downwardly while being rotated upright, and the front end 110 of the lid is oriented upward with the trace pin 112 as center of rotation.

The rear lid 109 comprises: a rotating body 115 which is assembled to be capable of rotation with the trace pin 112 of the rear lid 109 as a rotating shaft 116, and has a posture control pin 117 on a free end which is oriented toward the rear in the state when the rear lid 109 is in the closed position; a link pin 113 which is provided in a place further back from the trace pin 112 on the bracket part 111 in the state when the rear lid 109 is in the closed position; and a forcing device 120 disposed between the bracket part 111 and the rotating body 115, which normally forces in a direction drawing apart the space between the posture control pin 117 and the link pin 113.

With the forcing of the forcing device 120, when the rear lid 109 is in the closed position, the link pin 113 enters the catch cavity 229 from beneath, and the posture control pin 117 is pushed against the support cam wall 231. In the bracket part 103 of the front lid 101, there is formed a release cavity 106 which allows the link pin 113 to enter from behind at a position where the front lid 101 enters into overlapped state beneath the rear lid 109 in the closed position, and allows the link pin 113 to escape from the catch cavity 229 accompanying the downwardly movement of the front lid 101.

The closed lid state of the front lid 101 in the closed position is maintained by the supporting device 20 (FIG. 1). In addition, the front lid 101 in the closed position is capable of moving backward by the guiding of the first cam groove 215. Because the front trace pin 104 and the rear trace pin 105 enter the first cam groove 215, the movement of the front lid 101 is regular and stable (FIG. 1 to FIG. 2).

When the rear lid 109 is in the closed position, because the link pin 113 enters the catch cavity 229 and the posture control pin 117 is pushed against the support cam wall 231 by the forcing of the forcing device 120 in the state in which the trace pin 112 enters the second cam groove 227, the closed lid state of the rear lid 109 is maintained stably (FIG. 1).

With the first cam groove 215, the front lid 101 first goes slightly downwardly while being moved backward and enters beneath the rear lid 109 which is kept in the closed lid state as previously noted. When the front lid 101 enters into an overlapped state beneath the rear lid 109, the link pin 113 enters the release cavity 106, and a state is created in which the rear lid 109 also can be moved accompanying the movement of the front lid 101 while maintaining the overlapped state. (Below, this state is called a linked state, and a position where the linked state is created is called a linked position. FIG. 2.)

When the first lid 101 is moved downwardly along the first cam groove 215 from the linked state, the link pin 113 escapes downwardly from the catch cavity 229, and the rear lid 109 also is moved downwardly together while being rotated upright, so that the front end 110 of the lid is oriented upward. The rear lid 109 thus moved is supported without rattling by the posture control pin 117 which continues to be pushed against the support cam wall 231 by the forcing of the forcing device 120 throughout the entire process of the movement (FIG. 5 to FIG. 11).

Figure 11:
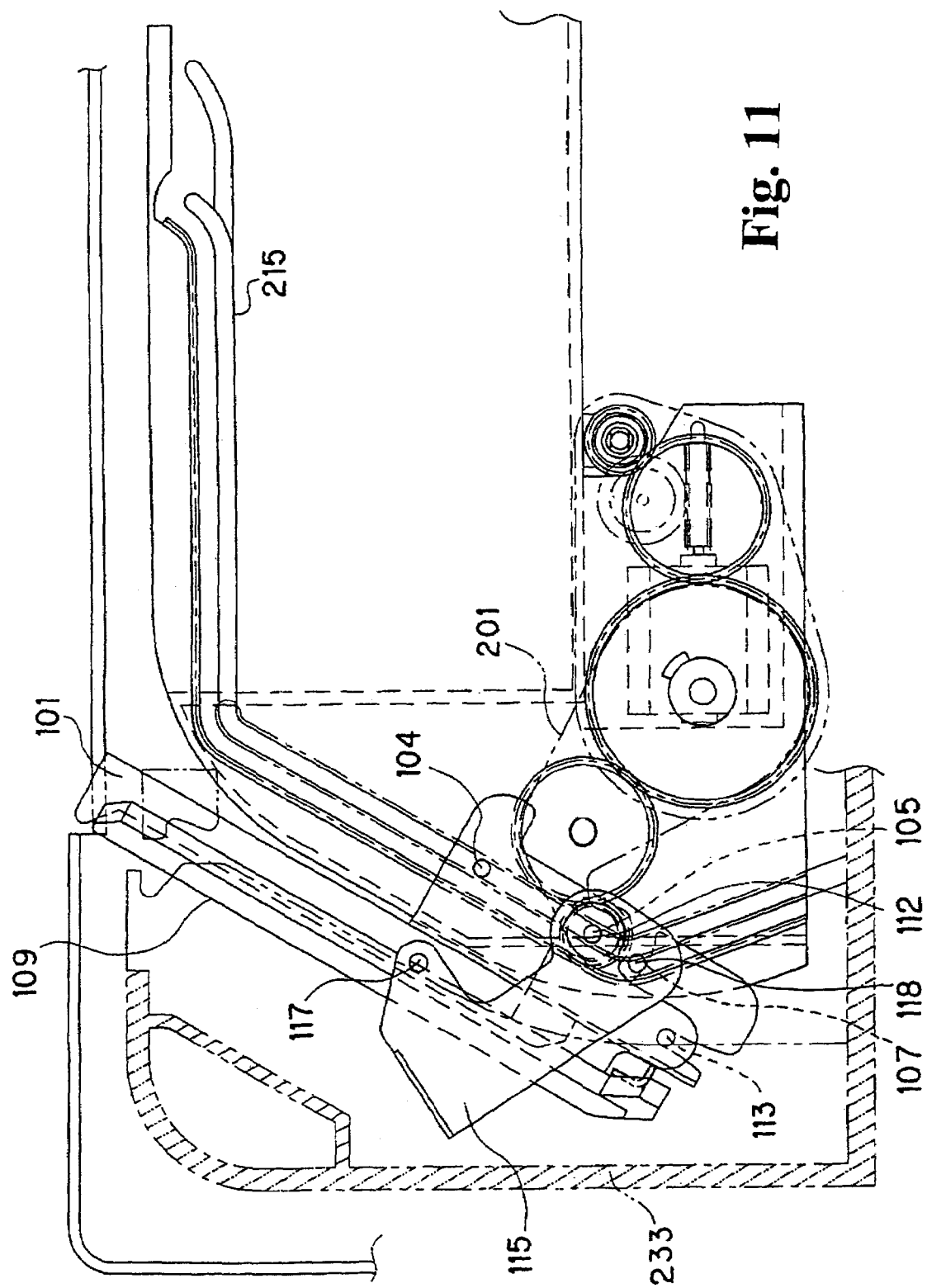
FIG. 11 is a side view showing the essential components of the storage body.

When the front lid 101 is moved completely downwardly along the first cam groove 215, the opening H is completely opened. (Below, this state is called a completely stored state, and a position of the lid 10 in the state is called a completely stored position. FIG. 11.) The front lid 101 and the rear lid 109 are entirely or largely positioned beneath the opening H in the overlapped state and having the front ends 102 and 110 of the lids oriented upward.

In this embodiment, the first cam groove 215 has a longitudinal groove part 216 which extends in the longitudinal direction, and a vertical groove part 219 which extends downwardly from the rear end 217 of the longitudinal groove part 216. The second cam groove 227 becomes as a groove which follows the vertical groove part 219 of the first cam groove 215 with the upper groove end 228 thereof being positioned at the same level as the rear end 217 of the longitudinal groove part 216 of the first cam groove 215. The trace pin 112 of the rear lid 109 in the closed position is positioned at the upper groove end 228 of the second cam groove 227. When the link pin 113 enters the release cavity 106 of the front lid 101, the rear trace pin 105 of the front lid 101 is positioned at the rear end 217 of the longitudinal groove part 216 of the first cam groove 215.

By this, in this embodiment, in the linked state, the rear trace pin 105 which serves as the center of rotation of the front lid 101 and the trace pin 112 which serves as the center of rotation of the rear lid 109 can be positioned at the same position. After the linkage, the front lid 101 and the rear lid 109 linked and overlapped together can be rotated upright smoothly (FIG. 2).

Also, in this embodiment: a hook cavity 107 which is opened downwardly is formed further back from the position of the formation of the rear trace pin 105 on the bracket part 103 of the front lid 101 in the closed position. A return operation pin 118 is formed beneath the rotating shaft 116 of the rotating body 115 of the rear lid 109 in the closed position. The return operation pin 118 enters the hook cavity 107 from the front accompanying the front lid 101 and the rear lid 109 together being moved downwardly while being rotated upright.

Figure 8:
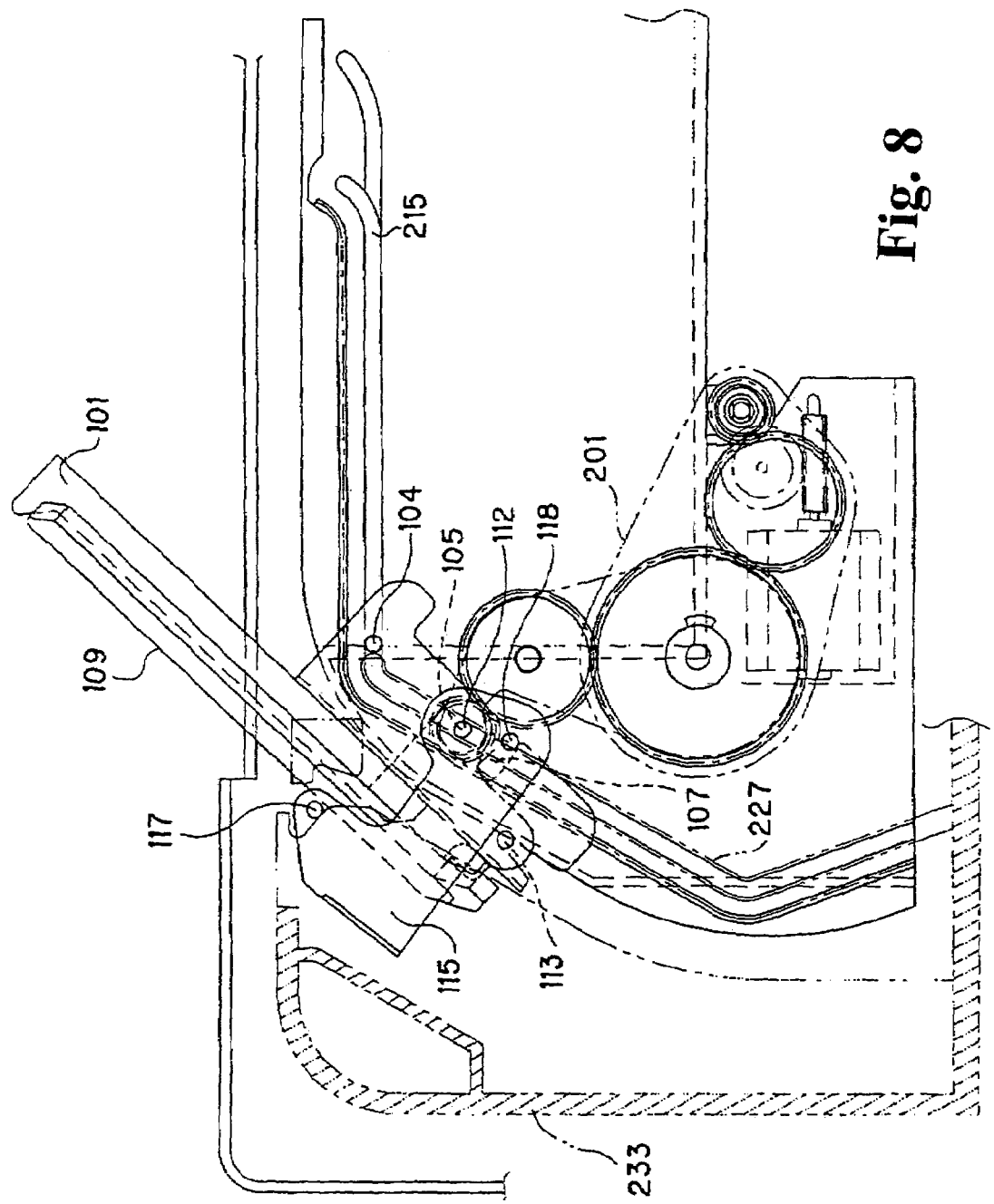
FIG. 8 is a side view showing the essential components of the storage body.
Figure 9:
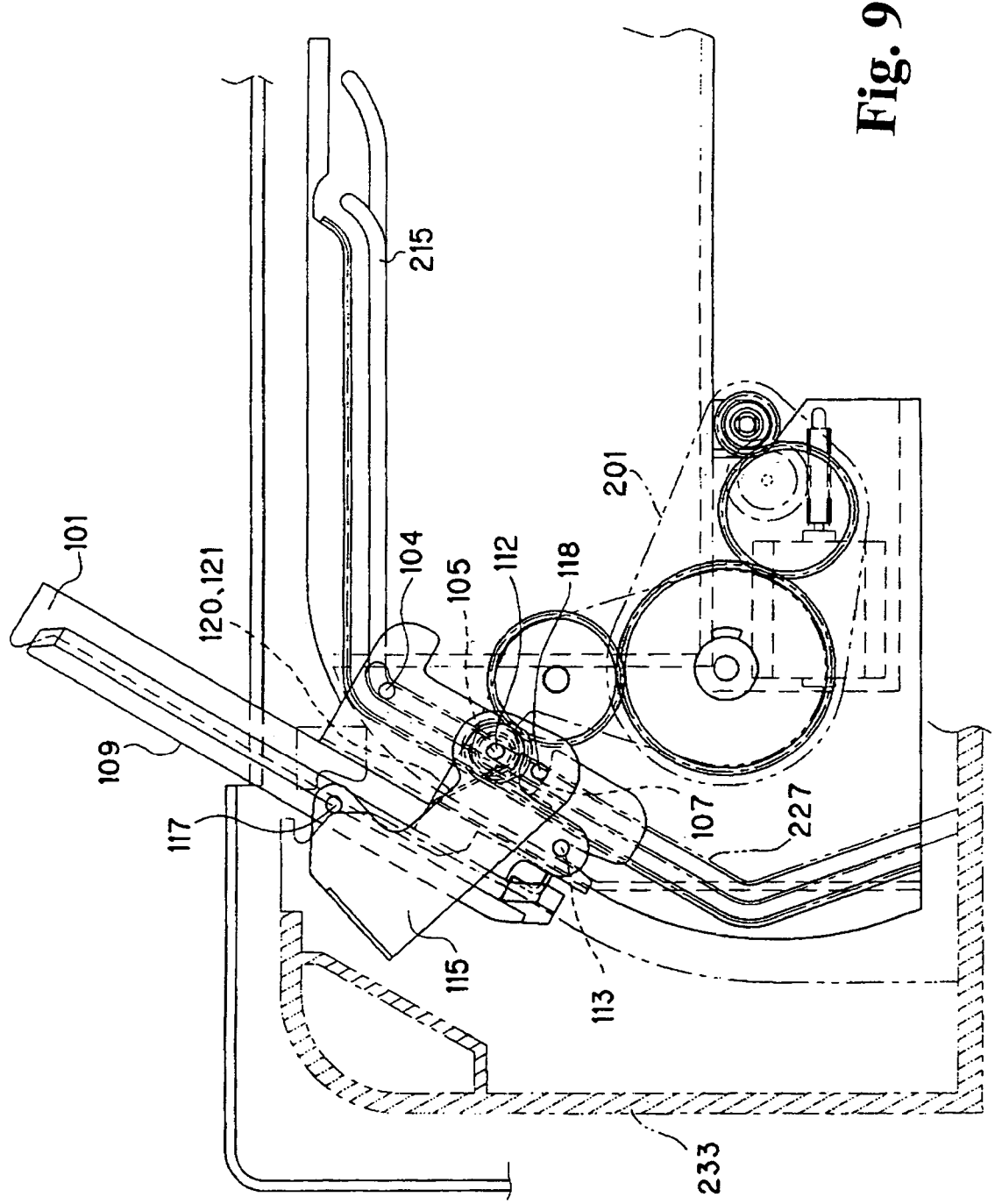
FIG. 9 is a side view showing the essential components of the storage body.
Figure 10:
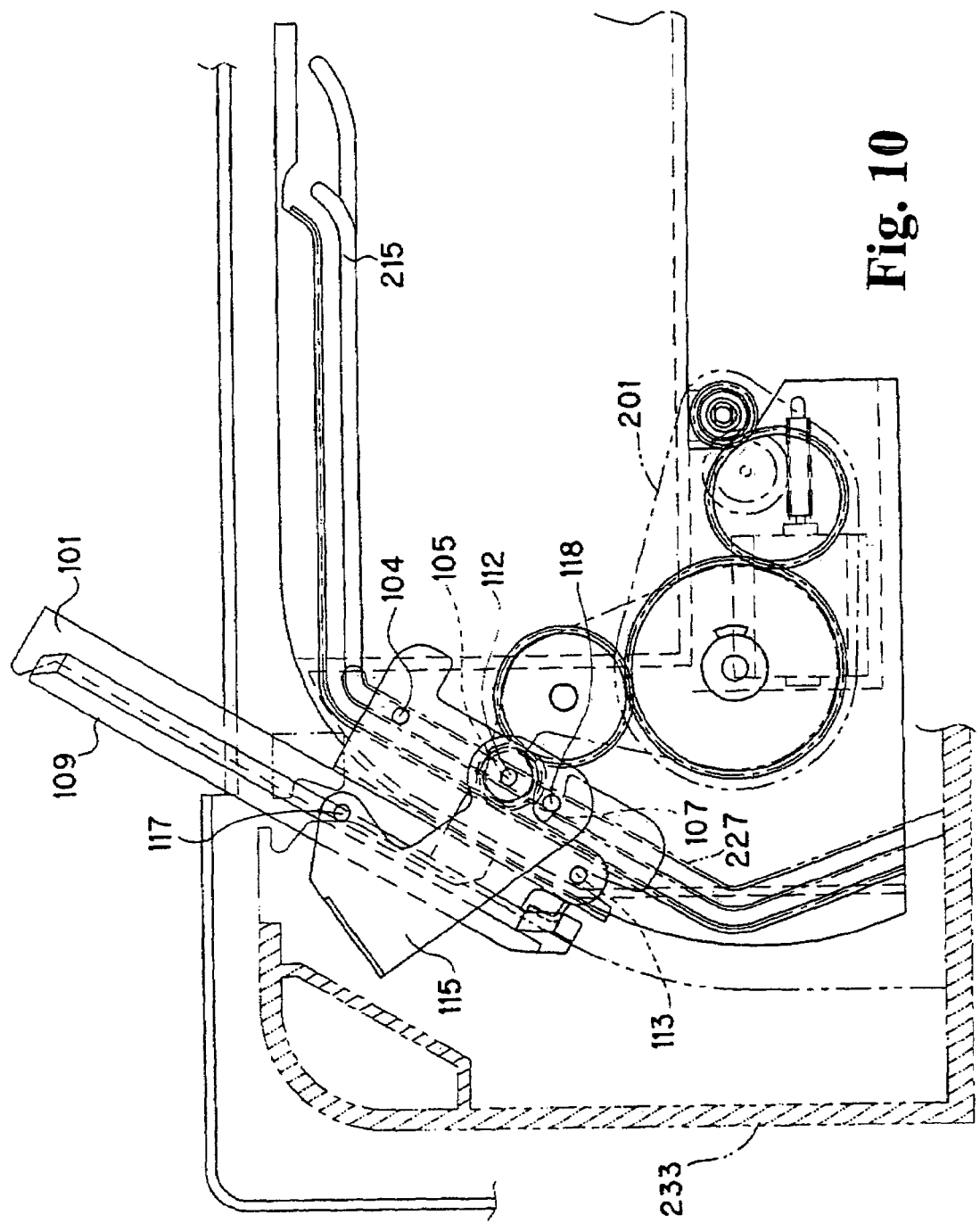
FIG. 10 is a side view showing the essential components of the storage body.

By this, in this embodiment, in the case when the front lid 101 is subjected to a force in the direction of causing the front lid 101 to move again upwardly, that is, move back, from the completely stored state, the rear lid 109 which has the return operation pin 118 hooked in the hook cavity 107 can move toward the linked position while maintaining the linked state with the front lid 101 (FIG. 11 to FIG. 8).

Figure 5:
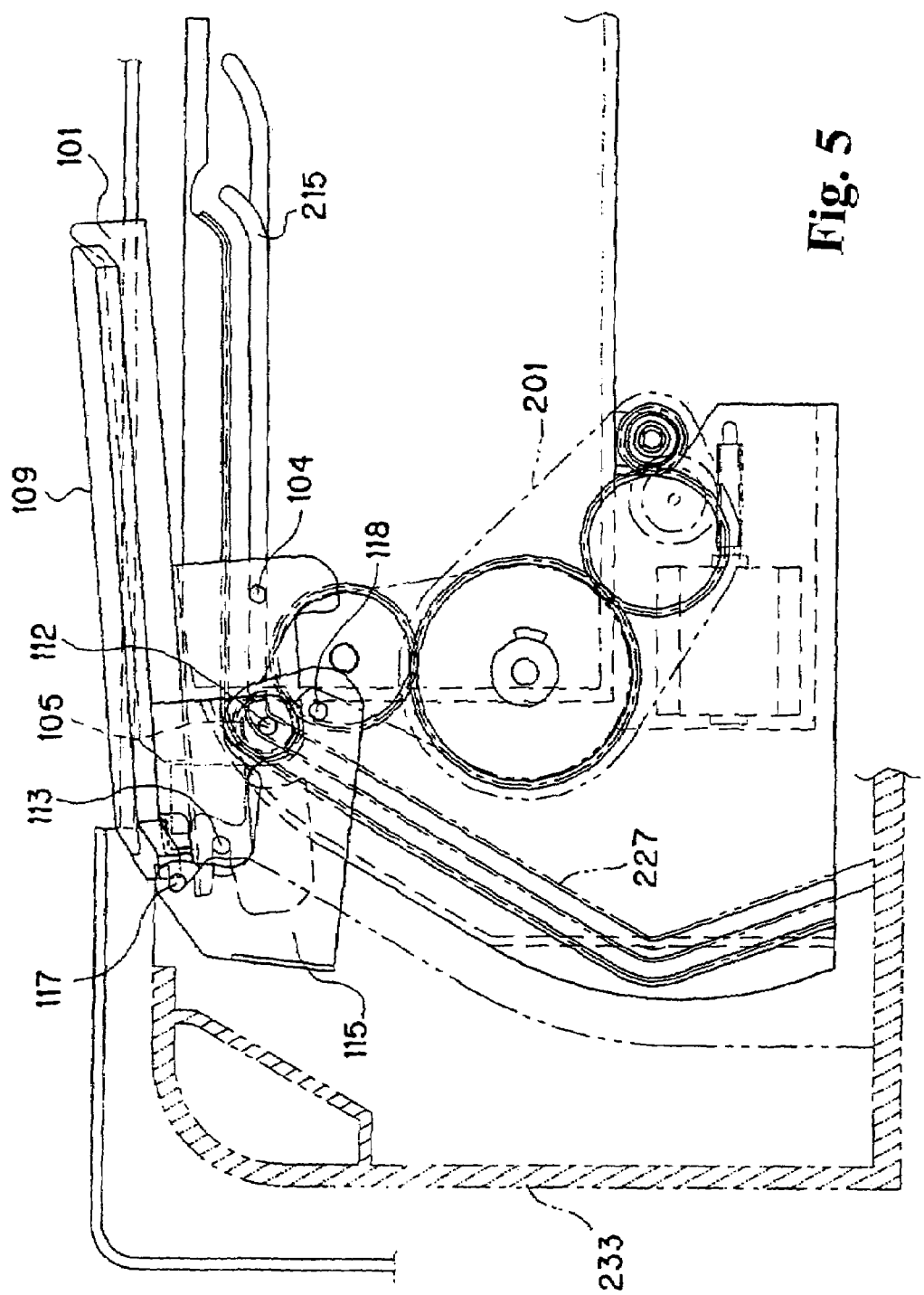
FIG. 5 is a side view showing the essential components of the storage body.
Figure 6:
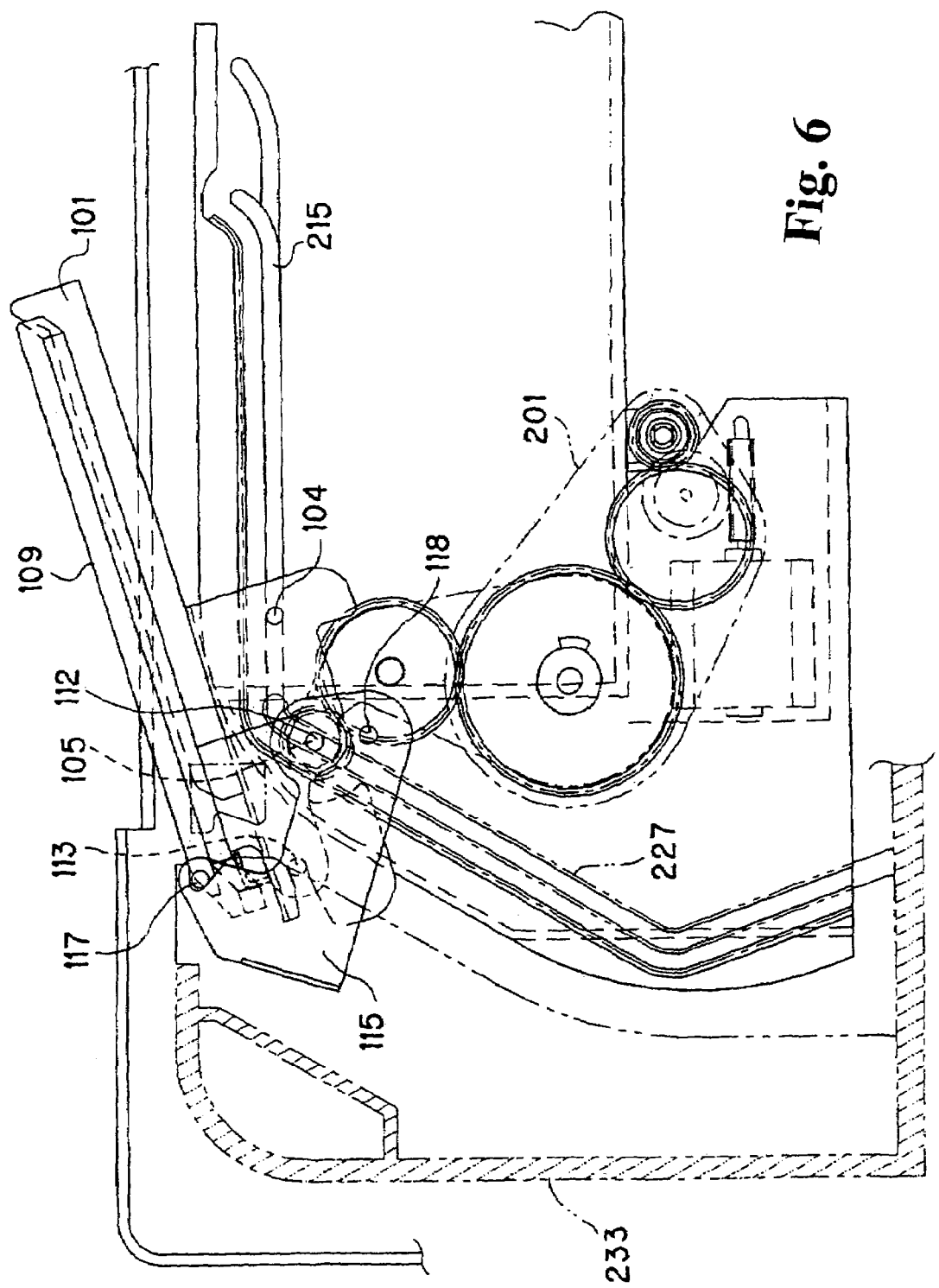
FIG. 6 is a side view showing the essential components of the storage body.
Figure 7:
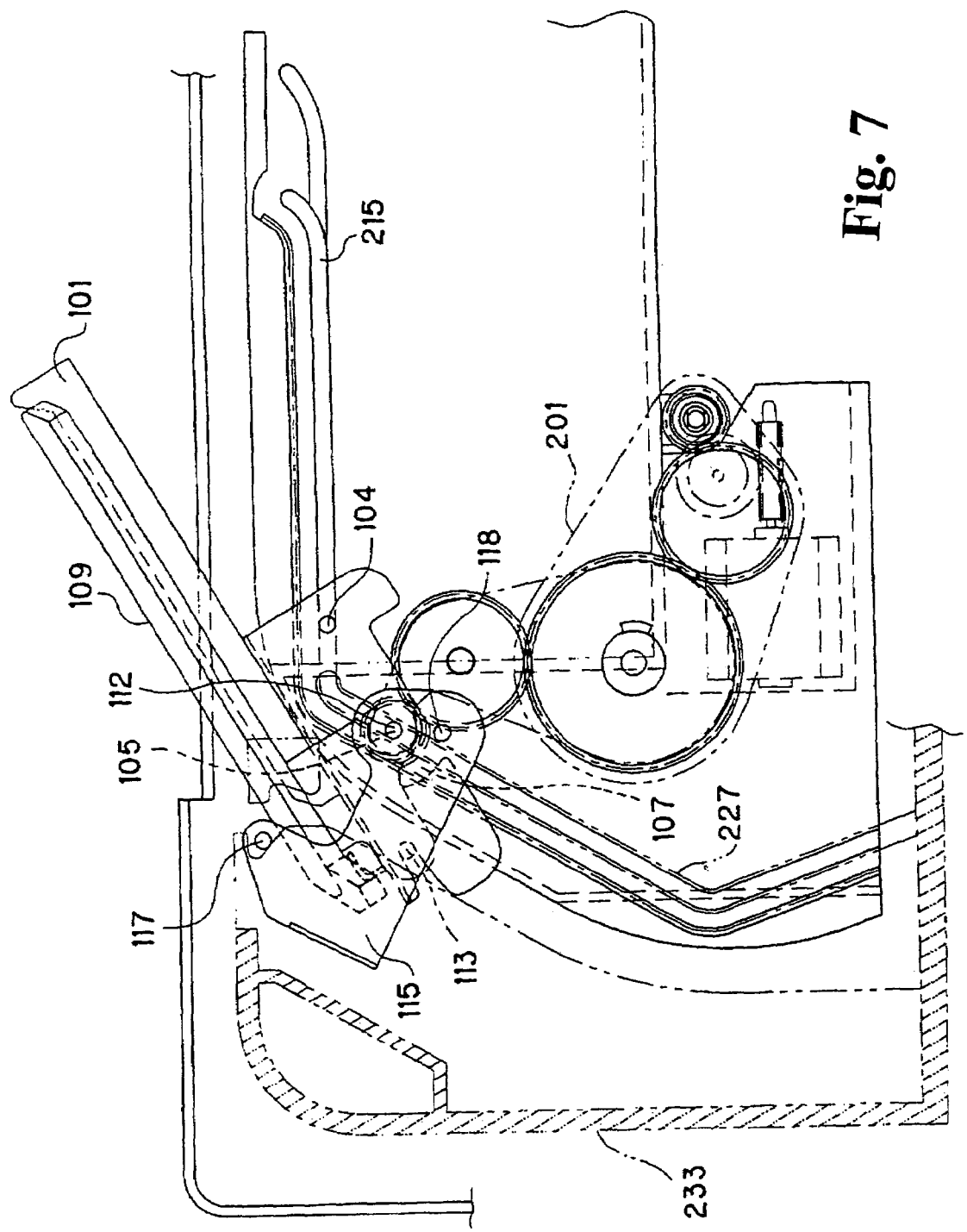
FIG. 7 is a side view showing the essential components of the storage body.

In the process of movement to the linked position, the rotating body 115 is rotated in the direction of allowing the return operation pin 118 to escape again from the hook cavity 107, and the rear lid 109 which is raised up to the linked position is positioned in the closed position by the forcing of the forcing device 120 (FIG. 7 to FIG. 5, and furthermore FIG. 2).

From the state in which the rear lid 109 is positioned again in the closed position and when the front lid 101 is moved back along the first cam groove 215, the link pin 113 escapes from the release cavity 106, and the front lid 101 escapes from the rear lid 109 and then is slid backward while being moved upward, and it is positioned again in the closed position (FIG. 2 to FIG. 1).

In this embodiment, the supporting device 20 is constituted by a drive force transmission arm 201 which has a follower end 202 connected to the bracket part 103 of the front lid 101, and is constituted such that the space between the follower end 202 and a driving end 203 can be changed accompanying the movement of the front lid 101. The front lid 101 is moved by the drive force transmission arm 201 which is moved by a motor 204.

By this, in this embodiment, the forward movement and return movement of the front lid 101, that is, the lid opening operation and lid closing operation of the divided lid 1, can be accomplished smoothly by driving of the motor 204. That is, although the sliding movement and downwardly movement while being rotated upright of the front lid 101 when it is moved forward from the closed position by the guiding of the first cam groove 215, and the upward movement while being rotated face down and sliding movement of the front lid 101 when it is moved back from the completely stored position, do not become movements along the arc of a circle centered on the driving end 203 of the drive force transmission arm 201. Because the drive force transmission arm 201 is constituted such that the space between the follower end 202 and driving end 203 can be changed accompanying the movement of the front lid 101, it is possible to move the front lid 101 back and forth by the driving of the motor 204 without obstruction along the first cam groove 215.

In the illustrated example, the divided lid 1 is constituted by two lids being a front lid 101 and a rear lid 109. Also, the front part Ha of the longitudinally long opening H is closed from above by the front lid 101 which is in a roughly horizontal position, and the rear part Hb of the opening H is closed from above by the rear lid 109 which is in a roughly horizontal position.

In the illustrated example, the opening H is constituted by the opened upper surface of an inner box 221 which comprises a bottom plate 222 and a front plate 223 as well as a rear plate 224 and a pair of side plates 225, and has the upper surface opened up. In the illustrated example, such an inner box 221 is set in an inserted manner inside an outer box 233 which has a bottom plate 234 and a front plate 235 as well as a rear plate 236 and a pair of side plates 237, and has the upper surface opened up. A space is formed in all positions between the outer surface of the inner box 221 and the inner surface of the outer box 233. Also, in the illustrated example, the overlapped front lid 101 and rear lid 109 are held in the completely stored position with the space between the outer surface of the rear plate 224 of such inner box 221 and the inner surface of the rear plate 236 of the outer box 233 as a storage space S. Also, in the illustrated example, such an outer box 233 is furthermore held inside an outermost box 3 having an opening H on the upper surface.

The bracket part 103 of the front lid 101 is constituted as a plate shape having a plate surface following the direction of movement of the front lid 101. The bracket part 103 is provided respectively on both left and right sides of the front lid 101. Also, the rear end of the bracket part 103 projects out further back from the rear end of the front lid 101.

The bracket part 111 of the rear lid 109 is constituted as a plate shape having a plate surface following the direction of movement of the rear lid 109. The bracket part 111 is provided respectively on both left and right sides of the rear lid 109.

Also, in the illustrated example, the bracket part 103 of the front lid 101 is positioned outside the side plate 225 of the inner box 221, and the bracket part 111 of the rear lid 109 is positioned in a position further out from the outer surface of the bracket part 103 of the front lid 101. Furthermore, the rotating body 115 is positioned between the inner surface of the side plate 237 of the outer box 233 and the bracket 111 of the rear lid 109 (FIG. 12).

In the illustrated example, the coupling part 108 which is hooked from behind by the coupled part 114 formed on the front end 110 of the rear lid 109 is formed on the rear end side of the front lid 101. By this, in the illustrated example, when only the rear lid 109 is subjected to a force in the direction of causing the rear lid 109 to move toward the storage space S from the state in which the front lid 101 and the rear lid 109 both are in the closed position, the front lid 101 also is slid and moved backward accompanying this. In the illustrated example, the sliding movement of the front lid 101 is detected by a limit switch 4 which contacts a switch plate 40 on the front end of the bracket part 103 of the front lid 101 in the closed position. When such a sliding movement occurs, the driving of the motor 204 is begun so as to cause the front lid 101 to move back.

The divided lid 1, as shown in FIG. 18, also can be constituted including an intermediate lid 122 which is disposed between the front lid 101 and the rear lid 109 and closes the opening H in the closed position together with these.

In this case, on the intermediate lid front end side of the intermediate lid 122, there is formed a front coupled part 123 which is hooked from behind by a coupling part 108 of the front lid 101 positioned in front by the forward sliding movement of this front lid 101 positioned in front. On the intermediate lid rear end side of the intermediate lid 122, there is formed a rear coupled part 124 which is hooked from in front by the coupling part 108 of the front lid 101 positioned in front by the forward sliding movement of this front lid 101 positioned in front.

From the state in which each lid 10 is in the closed position, first, the coupling part 108 of the front lid 101 positioned in front of the intermediate lid 122 hooks onto the rear coupled part 124 of the intermediate lid 122 by the backward movement of the front lid 101 positioned in front. The lids 10 can be slid and moved together backward in a state in which the front lid 101 positioned in front enters into an overlapped state beneath the intermediate lid 122. (In this case, the front lid 101 is moved downwardly by the first cam groove 215 up to the position where it can enter beneath the intermediate lid 122 while moving backward, and onward from the position where the coupling part 108 is hooked onto the rear coupled part 124, both lids 10 are moved further downwardly together by the first cam groove 215 up to the position where they can enter beneath the rear lid 109.)

Upon returning from the state in which each lid 10 is in the completely stored state, the coupling part 108 of the front lid 101 positioned in front of the intermediate lid 122 is hooked onto the front coupled part 123 of the intermediate lid 122 by the forward movement of the front lid 101 positioned in front. Accordingly, the intermediate lid 122 can be slid and moved together up to the closed position accompanying the movement of the front lid 101 positioned in front toward the closed position.

In the illustrated example, the operating mechanism 2 is provided respectively on both left and right sides of the inner box 221. The left and right operating mechanisms 2 are laid out linear symmetrically on an imaginary reference line passing through the longitudinal direction of the inner box 221. The left bracket parts 103 and 111 of the front lid 101 and rear lid 109 are linked to the left operating mechanism 2, and the right bracket parts 103 and 111 of the front lid 101 and rear lid 109 are linked to the right operating mechanism 2 (FIG. 12).

In the illustrated example, the first cam groove 215 is formed on the outer surface of the side plate 225 of the inner box 221. The first cam groove 215 has a longitudinal groove part 216 and a vertical groove part 219. The longitudinal groove part 216 extends roughly in the horizontal direction, and has a curved groove part 218 with a front end standing somewhat upwardly in a curved manner. Behind the curved groove part 218, there is formed a branch groove part 220 which stands upwardly in a manner having about the same curvature as the curved groove part 218 up to the same level as the curved groove part 218. The front trace pin 104 of the front lid 101 in the closed position is positioned at the upper end of the curved groove part 218, and the rear trace pin 105 is positioned at the upper end of the branch groove part 220. By this, when the forward movement of the front lid 101 in the closed position is started by the driving of the motor 204, the front lid 101 is lowered to the level where it enters beneath the rear lid 109 while being moved backward. The vertical groove part 219 becomes a groove part which is connected at its upper end to the rear end 217 of the longitudinal groove part 216, and is inclined in a direction gradually retreating backward as it goes downwardly from the connected place.

In the illustrated example, the second cam groove 227 is formed on the inner surface of the side plate 237 of the outer box 233. The second cam groove 227 becomes a groove which is positioned at its upper end 228 at the same level as the upper end of the vertical groove part 219 of the first cam groove 215, and from there continues downwardly at the same angle as the vertical groove part 219.

In the illustrated example, the support cam wall 231 also is formed on the inner surface of the side plate 237 of the outer box 233. The upper end of the support cam wall 231 is positioned above the upper end 228 of the second cam groove 227. On the support cam wall 231, a wall surface between its upper end and the level where the upper end 228 of the second cam groove 227 is positioned is made as a projecting wall surface 232 projecting forward from its upper end wall surface. A wall surface beneath the projecting wall surface 232 is made as a wall surface which is inclined at almost the same angle as the second cam groove 227.

When the rear lid 109 is in the closed position, the posture control pin 117 is pushed against the support cam wall 231 upwardly from such projecting wall surface 232. By this, in the illustrated example, when a force in the direction of pushing in downwardly is applied only to the rear lid 109 in the closed position, the posture control pin 117 is moved somewhat downwardly following the support cam wall 231. When the posture control pin 117 is moved somewhat downwardly in this manner by the projecting wall surface 232 of the support cam wall 231, the recoil force of a torsion coil spring 121 serving as a forcing device 120 (described later) is strengthened. When such a force is applied to the rear lid 109 unexpectedly, it pushes back the rear lid 109 to the closed position.

In the illustrated example, the catch cavity 229 is formed on the inner surface of the side plate 237 of the outer box 233. The catch cavity 229 is formed in front of the support cam wall 231 behind the second cam groove 227, and at the level between the upper end of the second cam groove 227 and the upper end of the support cam wall 231. The catch cavity 229 is formed in the projecting part 230 which projects out from the inner surface of the side plate 237 of the outer box 233.

In the illustrated example, the drive force transmission arm 201 which constitutes the supporting device 20 is constituted such that the driving end 203 is positioned below and the follower end 202 is positioned above in the state when the front lid 101 is in the closed position.

In the illustrated example, the drive force transmission arm 201 is constituted by: a lower plate 208 which supports a drive gear 209 and a lower transmission gear 210 which engages the drive gear 209; an upper plate 212 which supports a follower gear 214 and an upper transmission gear 213 which engages the follower gear 214; being joined to be capable of rotation by a rotating shaft of an intermediate gear 211 which engages both the lower transmission gear 210 and the upper transmission gear 213.

In the illustrated example, the motor 204 is installed on the outer surface of the bottom plate 222 of the inner box 221, and the drive force of the motor 204 is transmitted by means of a worm 205 and a worm wheel 206 to a drive shaft 207 which is disposed beneath the bottom plate 222 of the inner box 221 and extends in the lateral direction, and drives to rotate the drive gear 209 which is provided on the end part of this drive shaft 207. The lower plate 208 is caused to rotate centered on the end part of the drive shaft 207.

The follower gear 214 is incorporated in a place on the pin shaft of the rear trace pin 105 of the front lid 101 where it escapes from the first cam groove 215, and the upper plate 212 is rotated centered on the pin shaft of this rear trace pin 105.

In the illustrated example, a rack 226 which follows the first cam groove 215 is formed above the first cam groove 215 on the side plate 225 of the inner box 221. The follower gear 214 moves along the rack 226 while the rack 226 engages the follower gear 214. By this, in the illustrated example, the front lid 101 is moved forward and backward smoothly following the first cam groove 215 by the driving of the motor 204.

The front trace pin 104, rear trace pin 105, catch cavity 229, and hook cavity 107 are formed on the bracket part 103 of the front lid 101.

The front trace pin 104 and rear trace pin 105 both are constituted such that one end of the pin shaft is integrally joined to the inner surface of the bracket part 103 and the other end is inserted into the first cam groove 215.

The catch cavity 229, in the illustrated example, is constituted by a notch which is opened on the rear end of the bracket part 103 and extends in the horizontal direction in the state when the front lid 101 is in the closed position. The catch cavity 229 is provided in a position above the level of formation of the front trace pin 104 and the rear trace pin 105.

The hook cavity 107, in the illustrated example, is constituted by a notch which is opened on the lower end of the bracket part 103 and extends upwardly in the state when the front lid 101 is in the closed position. The hook cavity 107 is provided behind the rear trace pin 105, and it is formed so as to follow the arc of a circle centered on the rear trace pin 105. The reason why it is made thus is because in the joined state, the rear trace pin 105 of the front lid 101 and the trace pin 112 of the rear lid 109 are positioned on the same axis, and also the rotating body 115 of the rear lid 109 is incorporated to be capable of rotating on the pin shaft of the trace pin 112 of the rear lid 109. Therefore, the track of movement of the return operation pin 118 of the rotating body 115, which is rotated to be rotated upright with the free end oriented forward by the rotating upward of the rear lid 109 having come together with the front lid 101, also comes to follow the arc of the circle centered on the rear trace pin 105.

The trace pin 112 and the link pin 113 are formed on the bracket part 111 of the rear lid 109. The trace pin 112 is provided at the lower part on the front side of the bracket part 111 of the rear lid 109 in the closed position. The trace pin 112 is constituted such that one end of the pin shaft is integrally joined to the outer surface of the bracket part 111 and the other end is inserted into the second cam groove 227.

The link pin 113 is provided above the level of formation of the trace pin 112 on the rear end side on the bracket part 111 of the rear lid 109 in the closed position. The link pin 113 is provided in a manner such that one end of the pin shaft projects from the inner surface of the bracket part 111, and the other end of the pin shaft projects from the outer surface of the bracket part 111. Also, in the illustrated example, one end of this link pin 113 is caught by the release cavity 106 of the front lid 101, and the other end of the link pin 113 enters and is held by the catch cavity 229 by the force of the forcing device 120.

The rotating body 115 is incorporated to be capable of rotating on the bracket part 111 of the rear lid 109. In the illustrated example, the rotating body 115 has a plate shape which is rotated being sandwiched between the outer surface of the bracket part 111 of the rear lid 109 and the inner surface of the side plate 237 of the outer box 233, and also it is combined to be capable of rotating on the bracket part 111 of the rear lid 109 in a manner such that the intermediate part of the pin shaft of the trace pin 112 is passed through a shaft hole 119 which is formed in a place positioned on the front side in the state when the rear lid 109 is in the closed position.

The posture control pin 117 and the return operation pin 118 are formed on the rotating body 115. The posture control pin 117 is provided in a manner such that one end of the pin shaft is integrally joined to the outer surface of the rotating body 115. In the illustrated example, the posture control pin 117 is provided at a level positioned above the level of formation of the link pin 113 of the rear lid 109 in the closed position.

The return operation pin 118 is provided in a manner such that one end of the pin shaft is integrally joined to the inner surface of the rotating body 115. In the illustrated example, the return operation pin 118 is provided in a position below the level of formation of the link pin 113 of the rear lid 109 in a place positioned on the front side of the rotating body 115 in the state when the rear lid 109 is in the closed position.

The forcing device 120, in the illustrated example, is constituted by a torsion coil spring 121, which is provided on the trace pin 112 between the outer surface of the bracket part 111 of the rear lid 109 and the inner surface of the rotating body 115, so that the pin shaft of the pin is passed through the wound part. One end of the spring 121 is fixed to the bracket part and the other end of the spring 121 is fixed to the rotating body 115.

The disclosure of Japanese Patent Application No. 2004-140019, filed on May 10, 2004, is incorporated in the application.

While the invention has been explained with reference to the specific embodiments of the invention, the explanation is illustrative and the invention is limited only by the appended claims.

What is claimed is:

1. A lid mechanism comprising:
   a divided lid for closing an opening of a storage body at a closed position, said divided lid having at least a front lid for closing a front part of the opening and a rear lid for closing a rear part of the opening, and
   a lid operating mechanism attached to the divided lid for moving the divided lid such that the front lid in the closed position moves from a front side of the opening to a rear side of the opening beneath the rear lid situated at the closed position and then moves downwardly together with the rear lid in an overlapped state.

2. A lid mechanism according to claim 1, further comprising a moving device for releasing the rear lid from the closed position and moving the rear lid downwardly together with the front lid when the front lid moves to the rear side of the opening, and a returning device for moving the rear lid upwardly to the closed position when the front lid which was completely opened moves back to the closed position.

3. A lid mechanism according to claim 1, wherein said operating mechanism includes a supporting device for supporting the front lid, a first cam groove, a second cam groove situated adjacent to the first cam groove, a catch cavity situated adjacent to the first cam groove and having a cavity entrance facing downwardly, and a support cam wall situated behind the second cam groove and having a wall surface facing forward.

4. A lid mechanism according to claim 3, wherein said front lid includes a first bracket part, a front trace pin formed on the first bracket part and guided by the first cam groove, and a rear trace pin formed on the first bracket part with a distance from the front trace pin and guided by the first cam groove so that after the front lid in the closed position moves from the front side of the opening to the rear side of the opening beneath the rear lid situated at the closed position, the front lid rotates around the rear trace pin and moves downwardly with the front end thereof facing upwardly.

5. A lid mechanism according to claim 4, wherein said rear lid includes a second bracket part, and a trace pin formed on the second bracket part and guided by the second cam groove so that the rear lid moves downwardly while rotating upwardly around the trace pin and a front end thereof facing upwardly.

6. A lid mechanism according to claim 5, wherein said rear lid further includes a rotating body rotatably disposed with the trace pin and having a posture control pin on a free end thereof facing a rear side when the rear lid is situated in the closed position, a link pin disposed at a position further back from the trace pin when the rear lid is situated in the closed position, and a forcing device disposed between the second bracket part and the rotating body for always urging the posture control pin and the link pin to move away from each other so that the link pin enters the catch cavity from beneath and the posture control pin is pushed against the support cam wall by the forcing device when the rear lid is situated in the closed position.

7. A lid mechanism according to claim 6, wherein said front lid further includes a release cavity in the first bracket part for allowing the link pin to enter the catch cavity from behind when the front lid enters beneath the rear lid situated in the closed position, said release cavity allowing the link pin to escape from the catch cavity when the front lid moves downwardly.

8. A lid mechanism according to claim 7, wherein said first cam groove includes a longitudinal groove part extending in a longitudinal direction and a vertical groove part extending downwardly from a rear end of the longitudinal groove part, said second cam groove extending along the vertical groove part of the first cam groove and having an upper groove end situated at a level substantially same as that of a rear end of the longitudinal groove part, said trace pin being situated at the upper groove end of the second cam groove when the rear lid is situated in the closed position, said rear trace pin being situated at the rear end of the longitudinal groove part when the link pin enters the release cavity.

9. A lid mechanism according to claim 7, wherein said first bracket part includes a hook cavity opened downwardly and situated further back from the rear trace pin when the front lid is situated in the closed position, said rotating body having a return operation pin below a rotating shaft thereof when the rear lid is situated in the closed position, said return operation pin entering the hook cavity from a front side when the front lid and the rear lid rotate upwardly and move downwardly together.

10. A lid mechanism according to claim 7, wherein said supporting device includes a drive force transmission arm having a follower end connected to the first bracket part and a driving end so that a distance between the follower end and the driving end changes when the front lid moves, said drive force transmission arm being moved by a motor to move the front lid.

11. A lid mechanism according to claim 1, wherein said divided lid further includes at least one intermediate lid disposed between the front lid and the rear lid for closing the opening at the closed position together with the front lid and the rear lid, said intermediate lid having a front coupled part at a front end thereof for engaging from behind a coupling part of the front lid situated ahead of the intermediate lid when the front lid moves forward, and a rear coupled part at a rear end thereof for engaging from front the coupling part of the rear lid situated behind the intermediate lid when the intermediate lid moves backward.

12. A center console box comprising the lid mechanism according to claim 1 and the opening closed by the divided lid.

* * * * *